United States Patent [19]

Borror et al.

[11] Patent Number: 4,826,976

[45] Date of Patent: May 2, 1989

[54] COLOR-SHIFTED DYES WITH THERMALLY UNSTABLE CARBAMATE MOIETY COMPRISING T-ALKOXYCARBONYL GROUP

[75] Inventors: Alan L. Borror, Lexington; Ernest W. Ellis, Carlisle; Donald A. McGowan, Stoneham, all of Mass.

[73] Assignee: Polaroid Corporation, Cambridge, Mass.

[21] Appl. No.: 134,600

[22] Filed: Dec. 18, 1987

Related U.S. Application Data

[60] Continuation of Ser. No. 855,446, Apr. 24, 1986, abandoned, which is a division of Ser. No. 646,771, Sep. 4, 1984, Pat. No. 4,602,263.

[51] Int. Cl.$^4$ .................. C09B 11/12; C09B 11/22; C09B 57/00; C09B 48/00
[52] U.S. Cl. .................. 544/58.4; 260/389; 260/390; 260/395; 534/741; 534/742; 534/887; 544/56; 544/59; 544/62; 544/370; 546/104; 548/110; 548/207; 548/455; 548/462; 548/469; 548/477; 548/505; 549/223; 549/224; 549/226; 549/227
[58] Field of Search .............. 534/646, 732, 733, 740, 534/741; 548/469, 505, 110, 207, 455, 462, 477; 549/226, 227, 223, 224, 264, 283, 304; 260/386, 390, 391, 392, 393, 394, 389, 395; 644/56, 59, 62, 370, 58.4; 646/104; 558/400

[56] References Cited

U.S. PATENT DOCUMENTS

| | | | |
|---|---|---|---|
| RE 29,168 | 4/1977 | Haseltine et al. | 346/201 X |
| 3,488,705 | 1/1970 | Fox et al. | 346/201 X |
| 3,679,657 | 7/1972 | Desai et al. | 534/646 |
| 3,708,258 | 1/1973 | Von Der Eltz et al. | 534/646 X |
| 3,723,121 | 3/1973 | Hauser | 346/201 X |
| 3,740,189 | 6/1973 | Doss et al. | 534/732 X |
| 3,832,212 | 8/1974 | Jenkins et al. | 346/201 X |
| 4,104,437 | 8/1978 | Vincent | 346/221 |
| 4,242,440 | 12/1980 | Yee et al. | 430/346 |
| 4,380,629 | 4/1983 | Yamashita et al. | 542/544 |

FOREIGN PATENT DOCUMENTS

| | | | |
|---|---|---|---|
| 1806582 | 5/1970 | Fed. Rep. of Germany | 534/646 |
| 1196225 | 6/1970 | United Kingdom | 534/646 |

OTHER PUBLICATIONS

Kosar, "Light–Sensitive Systems", pp. 402 to 409, John Wiley and Sons, Inc., New York (1965).

*Primary Examiner*—Floyd D. Higel
*Attorney, Agent, or Firm*—Sybil A. Campbell

[57] ABSTRACT

This invention relates to a color-shifted dye compounds containing at least one thermally unstable carbamate moiety which are useful in thermal imaging. These compounds may be represented by the formula [M—(X)$_q$]$_p$D wherein M is a carbamate moiety; X is —N=, —SO$_2$— or —CH$_2$—; D taken with X and M represents the radical of a color-shifted organic dye, said carbamate moiety M comprising a tert-alkoxycarbonyl group,

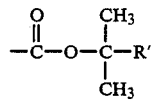

wherein R' is halomethyl or alkyl.

14 Claims, No Drawings

COLOR-SHIFTED DYES WITH THERMALLY UNSTABLE CARBAMATE MOIETY COMPRISING T-ALKOXYCARBONYL GROUP

This application is a continuation of application Ser. No. 855,446, Apr. 24, 1986, now abandoned, which is a division of application Ser. No. 646,771 filed Sept. 4, 1984, now U.S. Pat. No. 4,602,263 issued July 22, 1986.

BACKGROUND OF THE INVENTION

1. Field of the Invention

This invention relates to heat-sensitive recording elements particularly useful for making color hard copy, to a method of imaging using said elements and to novel organic compounds useful as the image-forming materials in said heat-sensitive recording elements.

2. Description of the Prior Art

A variety of thermal imaging systems for producing color images have been proposed, and several have been mentioned in Kosar, J., Light-Sensitive Systems: Chemistry and Application of Nonsilver Halide Photographic Processes, New York, John Wiley and Sons, Inc., 1965, pp. 402–19. In one type of heat sensitive recording system, a first sheet containing a first reagent is superposed with a second sheet containing a second reagent and one of the reagents is melted or vaporized by the imagewise application of heat and transferred for reaction with the other reagent to form a color image. In another type of "transferring system", images are formed by sequentially transferring two or more dyes carried on separate donor sheets to a common receptor sheet by melting or volatilization. In thermal imaging systems of the "self-containing" type, a single sheet is used and the imagewise heating of the heat-sensitive sheet produces a color image, for example, by rendering a coating layer transparent to reveal the color of a background layer, by initiating the chemical reaction of two or more reagents to form a colored product or by bleaching, coloring or changing the color of a single reagent. In most of the non-silver thermal imaging systems in commercial use, color images are formed using two or more reagents that usually are encapsulated or otherwise isolated from each other until melted and mixed upon imagewise heating.

A number of compounds which undergo a color change from a colorless to a colored form, from one color to another color or from a colored to a colorless form upon application of heat have been disclosed. For example, U.S. Pat. No. 3,723,121 discloses several thermochromic materials for laser beam recording including inorganic compounds, such as, black copper (II) oxide which decomposes to red copper (I) oxide upon heating and organic compounds, such as, polyacetylene compounds which subsequent to treatment with ultraviolet light undergo two changes in color, first to red then to yellow, as the temperature is increased. U.S. Pat. No. 4,242,440 discloses another class of heat-sensitive polyacetylene compounds which exhibit color changes, for example, gold to red, brown to orange and gold to orange, which color changes are reversible. U.S. Pat. No. 3,488,705 discloses thermally unstable organic acid salts of triarylmethane dyes useful in electrophotographic elements as sensitizing dyes that are decomposed and bleached upon heating. U.S. Pat. No. 3,745,009 reissued as Re. 29,168 and U.S. Pat. No. 3,832,212 disclose heat-sensitive compounds for thermography containing a heterocyclic nitrogen atom substituted with an —OR group, for example, a carbonate group that decolorize by undergoing homolytic or heterolytic cleavage of the nitrogen-oxygen bond upon heating to produce an RO+ ion or RO' radical and a dye base or dye radical which may in part fragment further. U.S. Pat. No. 4,380,629 discloses styryl-like compounds which undergo coloration or bleaching, reversibly or irreversibly via ring-opening and ring-closing in response to activating energies such as light, heat, electric potential and so on.

SUMMARY OF THE INVENTION

The present invention is concerned with a new class of heat-sensitive organic compounds and with their use in thermal imaging systems for optical recording and particularly for color hard copy for forming color images. In particular, the formation of color images in accordance with the present invention relies upon the irreversible unimolecular fragmentation of one or more thermally unstable carbamate moieties of an organic compound to effect a visually discernible color shift from colorless to colored, from colored to colorless or from one color to another.

Unlike many of the thermal imaging materials employed previously, the heat-sensitive compounds of the present invention may be used to produce color images of pictorial quality for color hard copy. Because the subject compounds undergo a unimolecular fragmentation, the change in spectral absorption characteristics, e.g., from the visible to the non-visible region of the spectrum or from the non-visible to the visible region of the spectrum can be achieved rapidly and efficiently and without the problems associated with isolating and then bringing two reagents together to effect image formation. Because the fragmentation is irreversible, changes in image density, e.g., in the highlight areas due to a reversal in bleaching or in the saturated areas due to a reversal in coloration are obviated. Also, the framentation can be achieved at moderately elevated temperatures above ambient temperatures so that the heat required for effecting the fragmentation can be kept below levels that would cause deformation or distortion of the imaging layer or other layers of the heat-sensitive element. Moreover, the subject heat-sensitive compounds may comprise various classes of dyes thereby permitting the selection of a wide range of colors as may be desired not only for monochromes but for full color images, and since image formation does not involve transfer and registration of separate colors, multicolor images of excellent sharpness and resolution can be readily obtained.

It is, therefore, the primary object of the present invention to provide a method of thermal imaging and heat-sensitive recording elements useful therein for producing a color image which employ a new class of heat-sensitive organic compounds.

It is another object of the present invention to provide novel compounds useful as heat-sensitive color image-forming materials.

Other objects of the invention will in part be obvious and will in part appear hereinafter.

The invention accordingly comprises the methods involving the several steps and the relation and order of one or more of such steps with respect to each of the others, and the products and compositions possessing the features, properties and the relation of elements which are exemplified in the following detailed disclosure, and the scope of the application of which will be indicated in the claims.

For a fuller understanding of the nature and objects of the invention, reference should be had to the following detailed description.

DESCRIPTION OF THE PREFERRED EMBODIMENTS

In accordance with the present invention, a method of thermal imaging is provided which comprises heating imagewise a heat-sensitive element comprising a support carrying at least one layer of an organic compound capable of undergoing an irreversible unimolecular fragmentation of at least one thermally unstable carbamate moiety, said organic compound initially absorbing radiation in the visible or the non-visible region of the electromagnetic spectrum and said imagewise heating effecting said irreversible unimolecular fragmentation of said carbamate moiety whereby the absorption of said organic compound is visibly changed in said layer in an imagewise pattern corresponding to said imagewise heating. By "visually changed" is meant a change in color from colorless to colored, from colored to colorless or from one color to another color that is visually discernible to the eye.

Typical of the compounds that may be employed in the subject method are those represented by the formula

wherein M is a carbamate moiety: X is $-N=$, $-SO_2-$, or $-CH_2-$; D taken with X and M represents the residue of an organic dye; q is 0 or 1; and p is a whole number of at least 1 and usually is a whole number of 1 to 3. Preferably, M has the formula

wherein R is alkyl usually having 1 to 4 carbon atoms; $-SO_2R_1$ wherein $R_1$ is alkyl usually having 1 to 6 carbon atoms; phenyl; naphthyl; or phenyl substituted with alkyl usually having 1 to 6 carbon atoms, alkoxy usually having 1 to 6 carbon atoms, halo, such as chloro or bromo trihalomethyl, such as, trichloromethyl or trifluoromethyl, cyano, nitro, carboxy, $-CONR_2R_3$ wherein $R_3$ each are hydrogen or alkyl usually having 1 to 6 carbon atoms, $-CO_2R_4$ wherein $R_4$ is alkyl usually having 1 to 6 carbon atoms or phenyl, $-COR_5$ wherein $R_5$ is amino, alkyl usually having 1 to 6 carbon atoms or phenyl, $-NR_6R_7$ wherein $R_6$ and $R_7$ each are hydrogen or alkyl usually having 1 to 6 carbon atoms, $-SO_2-NR_8R_9$ wherein $R_8$ and $R_9$ each are hydrogen, alkyl usually having 1 to 6 carbon atoms or benzyl and Z is an acyloxy group,

wherein $R_{10}$ is a tert-alkyl or $-(CH_2)_2Y$ wherein Y is an electron-withdrawing group.

The novel compounds of the present invention may be represented by the formula

wherein p, q, X and D have the same meaning given above and wherein M' has the formula

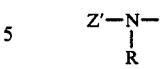

wherein R has the same meaning given above and Z' is

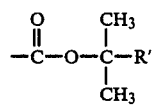

wherein R' is halomethyl, for example, methyl substituted with one, two or three halo groups, such as, chloro or bromo; or alkyl containing 1 to 20 carbon atoms. Preferably, said R' is alkyl, e.g., methyl, ethyl, propyl, butyl, octyl, decyl, dodecyl, octadecyl or eicosanyl.

As noted above, the heat-sensitive compounds of the present invention may comprise various classes of dyes, and D as defined in the foregoing formulae may comprise the residue of a triarylmethane dye, a xanthene dye, a rhodamine dye, a fluoran dye, an azocarbocyanine dye, a benzylidine dye, a thiazine dye, an acridine dye, an aminoanthraquinone dye or other dye containing a nitrogen atom possessing a lone pair of electrons, which when substituted with said acyloxy group to form said carbamate moiety, will be color-shifted. Preferably a tert-alkoxy carbonyl group, such as, tert-butoxycaronyl is used as the acyloxy group to isolate the lone pair of electrons on the nitrogen atom of the organic dye to effect said color shifting. The fragmentation of the resulting carbamate moiety upon application of heat releases said lone pair of electrons to effect a visually discernible change in the spectral absorption characteristics of the dye, preferably, from colored to colorless or colorless to colored.

The use of tert-butoxycarbonyl as a protecting group for nitrogen functionalities is well known, and the thermal lability, i.e., instability of this protecting group at 150° C.–170° C. is mentioned in Greene, Theodora W., Protective Groups in Organic Synthesis, New York, John Wiley and Sons, Inc., 1981, page 326. The thermal lability of O-t-alkyl sulfonyl carbamates is discussed by Roach, Louise C. and Daly W. H., Olefin Synthesis via Pyrolysis of O-t-Alkyl N-Toluene-p-Sulfonylcarbamates, Chemical Communications, p. 606–607 (1970).

Illustrative of the classes of compounds that may be employed in the present method are those represented in the following formulae:

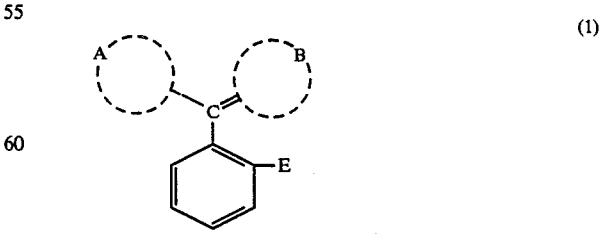

wherein A is phenyl moiety or a naphthyl moiety; B is a 4'-oxo-1'-phenylidene moiety or a 4'-oxo-1'-naphthylidene moiety, said A and B moieties being substituted or unsubstituted, and E is

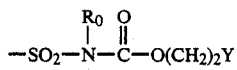

wherein $R_0$ is, for example, alkyl having 1 to 4 carbon atoms and Y is an electron-withdrawing group, preferably an electron-withdrawing group having a positive sigma value greater than 0.6 as defined by Hammett's Equation. Preferred electron-withdrawing groups include nitro, cyano,

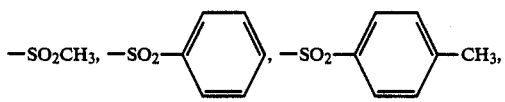

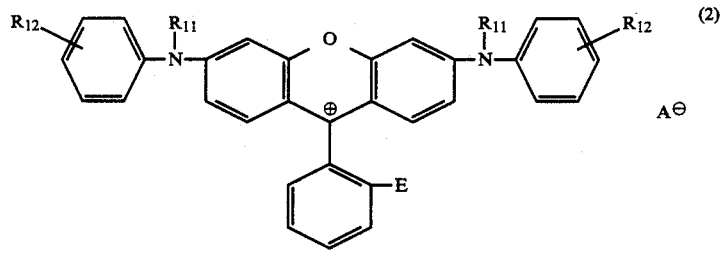

wherein each $R_{11}$, the same or different, is alkyl; each $R_{12}$, the same or different, is an electron-withdrawing group; $A^\ominus$ is an anion and E has the same meaning given in formula (1) above.

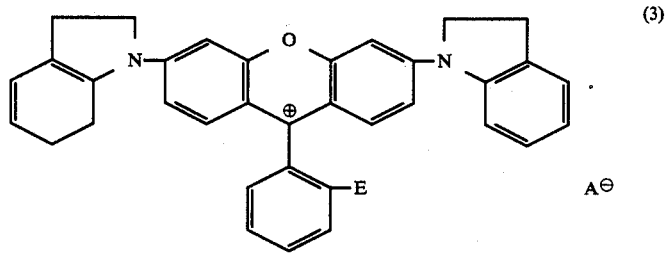

wherein $R^\ominus$ is an anion and E has the same meaning given in formula (1) above.

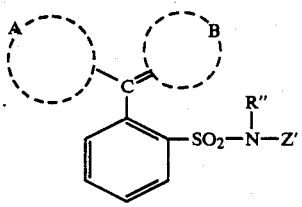

wherein A is a phenyl moiety or a naphthyl moiety; B is a 4'-oxo-phenylidene moiety or a 4'-oxo-naphthylidene moiety; R" is alkyl usually having 1 to 4 carbon atoms and Z' has the same meaning given in formula (III) above.

Preferred compounds of this type are those having the formula

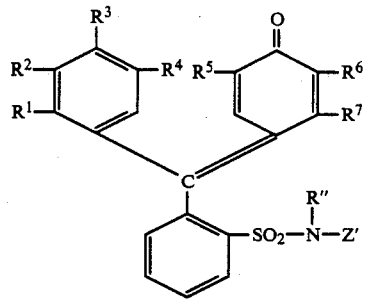

wherein $R^1$ is hydrogen, alkyl usually containing 1 to 6 carbon atoms, alkoxy usually containing 1 to 6 carbon atoms or hydroxy; $R^2$ and $R^4$ each are hydrogen, alkyl usually containing 1 to 6 carbon atoms, alkoxy usually containing 1 to 6 carbon atoms or halo, such as, chloro or bromo; $R^1$ and $R^2$ taken together represent the carbon atoms necessary to complete a fused benzene ring; $R^3$ is hydrogen, alkyl usually containing 1 to 6 carbon atoms, alkoxy usually containing 1 to 6 carbon atoms, hydroxy, —N,N—(dialkyl)amino wherein said alkyl usually contains 1 to 6 carbon atoms, piperidino, pyrrolidino, N-methylpiperizino, morpholino, or thiomorpholino; $R^5$ and $R^6$ each are hydrogen, alkyl usually containing 1 to 6 carbon atoms, alkoxy usually containing 1 to 6 carbon atoms or halo, such as, chloro or bromo; $R^7$ is hydrogen, alkyl usually containing 1 to 6 carbon atoms, alkoxy usually containing 1 to 6 carbon atoms or hydroxy; $R^6$ and $R^7$ taken together represent the carbon atoms necessary to complete a fused benzene ring; R" is alkyl usually containing 1 to 4 carbon atoms and Z' has the same meaning given in formula (III) above.

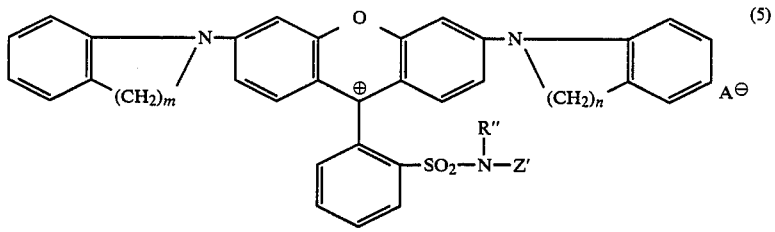

(5)

wherein m and n each are whole numbers from 2 to 6; R'' is alkyl usually having 1 to 4 carbon atoms; $A^{\ominus}$ is an anion and Z' has the same meaning given in formula (III) above.

In preferred compounds of this type, m and n are the same and m and n each are 2.

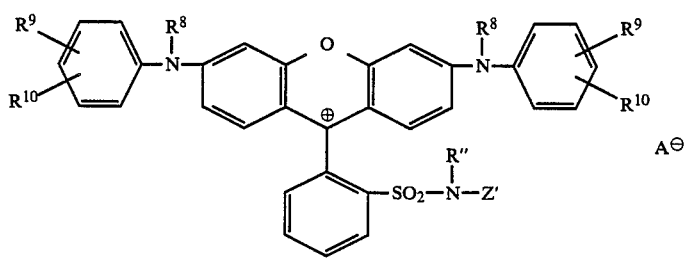

(6)

wherein each $R^8$, the same or different, is alkyl usually containing 1 to 20 carbon atoms; each $R^9$, the same or different, and each $R^{10}$, the same or different, are hydrogen, alkyl usually having 1 to 6 carbon atoms; alkoxy usually having 1 to 6 carbon atoms; halo, such as, chloro or bromo; —$SO_2R^{11}$ is alkyl usually having 1 to 6 carbon atoms, phenyl or phenyl substituted with alkyl usually having 1 to 4 carbon atoms; carboxy; —$CONR^{12}R^{13}$ wherein $R^{12}$ and $R^{13}$ each are hydrogen or alkyl usually having 1 to 6 carbon atoms; —$CO_2R^{14}$ is alkyl usually having 1 to 6 carbon atoms or phenyl; cyano; nitro; trihalomethyl, such as trichloromethyl or trifluoromethyl; —$COR^{15}$ wherein $R^{15}$ is amino, alkyl usually having 1 to 6 carbon atoms or phenyl; —$NR^{16}R^{17}$ wherein $R^{16}$ and $R^{17}$ each are hydrogen or alkyl usually having 1 to 6 carbon atoms or —$SO_2$—$NR^{18}R^{19}$ wherein $R^{18}$ and $R^{19}$ each are hydrogen, alkyl usually having 1 to 6 carbon atoms or benzyl; R'' is alkyl usually having 1 to 4 carbon atoms; $A^{\ominus}$ is an anion; Z' has the same meaning given in formula (III) above. It will be understood that said $R^9$ and $R^{10}$ may be ortho, meta or para to said N atom.

In preferred compounds of this type, said $R^9$ groups are the same and are halo, —$SO_2R^{11}$ or —$SO_2$—$NR^{18}R^{19}$ and said $R^{10}$ groups are the same.

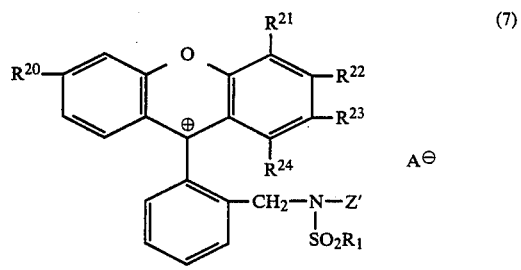

(7)

wherein $R^{10}$ is piperidino, pyrrolidino, morpholino, methylpiperidino, N-cyclohexylamino, N-alkyl-N-cyclohexylamino wherein said alkyl usually has 1 to 6 carbon atoms, N-benzyl-N-cyclohexylamino; $R^{21}$ is hydrogen, alkyl usually having 1 to 6 carbon atoms, halo, such as, chloro or bromo, amino including mono- or di-alkyl amino; $R^{22}$ is hydrogen, alkyl usually having 1 to 6 carbon atoms, alkoxy usually having 1 to 6 carbon atoms or halo, such as, cloro or bromo; $R^{23}$ is hydrogen, alkyl usually containing 1 to 6 carbon atoms, phenyl, N-piperidino, N-methylpiperidino, N-pyrrolidino, N-morpholino or —$NR^{25}R^{26}$ wherein $R^{25}$ is hydrogen, benzyl, alkyl containing 1 to 6 carbon atoms, acyl, such as, acetyl or cycloalkyl, such as, cyclohexyl and $R^{26}$ is hydrogen, alkyl usually having 1 to 6 carbon atoms, alkoxy usually having 1 to 6 carbon atoms, benzyl or halo, such as, chloro or bromo; $R^{24}$ is hydrogen, alkyl usually having 1 to 6 carbon atoms or alkoxy usually having 1 to 6 carbon atoms; $R_1$ is alkyl usually having 1 to 4 carbon atoms; $A^{\ominus}$ is an anion; and Z' has the same meaning given in formula (III) above.

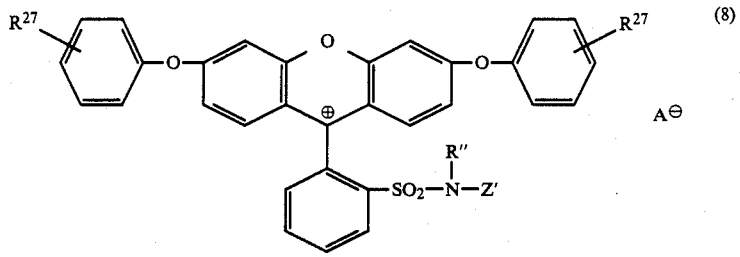

(8)

wherein each $R^{27}$, the same or different, are hydrogen, alkyl usually having 1 to 6 carbon atoms, alkoxy usually having 1 to 6 carbon atoms or N,N-(dialkyl)amino wherein said alkyl usually contains 1 to 6 carbon atoms; R'' is alkyl usually having 1 to 4 carbon atoms; $A^{\ominus}$ is an anion; and Z' has the same meaning given in formula (III) above, said $R^{27}$ groups being ortho, meta or para to said O atom.

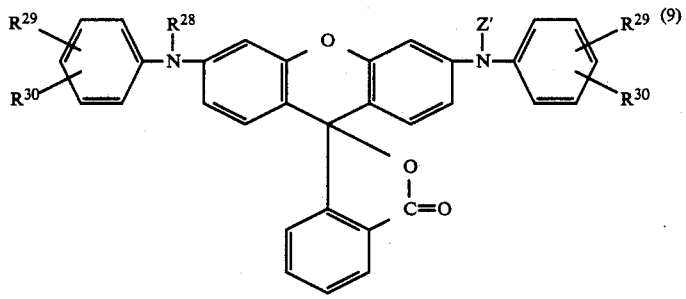

(9)

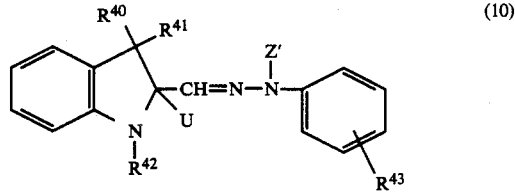

(10)

wherein $R^{28}$ is alkyl usually having 1 to 20 carbon atoms or the same as Z'; each $R^{29}$, the same or different and each $R^{30}$, the same or different, are hydrogen, alkyl usually having 1 to 6 carbon atoms; alkoxy usually having 1 to 6 carbon atoms, halo, such as, chloro or bromo; —$SO_2R^{31}$ wherein $R^{31}$ is alkyl usually having 1 to 6 carbon atoms, phenyl or phenyl substituted with alkyl usually having 1 to 4 carbon atoms; carboxy; —$CONR^{32}R^{33}$ wherin $R^{32}$ and $R^{33}$ each are hydrogen or alkyl usually having 1 to 6 carbon atoms. —$COR^{34}$ wherein $R^{34}$ is alkyl usually having 1 to 6 carbon atoms or phenyl; cyano; nitro; trihalomethyl, such as, trichloromethyl or trifluoromethyl; —$COR^{35}$ wherein $R^{35}$ is amino, alkyl usually having 1 to 6 carbon atoms or phenyl; —$NR^{36}R^{37}$ wherein $R^{36}$ and $R^{37}$ each are hydrogen or alkyl usually having 1 to 6 carbon atoms or —$SO_2$—$NR^{38}R^{39}$ wherein $R^{38}$ and $R^{39}$ each are hydrogen, alkyl usually having 1 to 6 carbon atoms or benzyl and Z' has the same meaning given in formula (III) above. It will be understood that said $R^{29}$ and $R^{30}$ groups may be ortho, meta or para to said N atom.

In preferred compounds of this type, said $R^{29}$ and said $R^{30}$ groups are the same. Preferably, said $R^{29}$ groups are halo, akyl, alkoxy, —$SO_2R^{31}$ or —$SO_2$—$NR^{38}R^{39}$, said $R^{30}$ groups are hydrogen or the same as said $R^{29}$ groups, and $R^{28}$ is the same as Z'.

wherein $R^{40}$, $R^{41}$ and $R^{42}$, the same or different, are hydrogen, alkyl usually having 1 to 6 carbon atoms; $R^{43}$ is hydrogen, carboxy, —$CONR^{44}R^{45}$ wherein $R^{44}$ and $R^{45}$ each are hydrogen or alkyl usually having 1 to 6 carbon atoms, —$CO_2R^{46}$ wherein $R^{46}$ is alkyl usually having 1 to 6 carbon atoms, alkoxy usually having 1 to 6 carbon atoms, nitro, cyano or halo, such as, chloro or bromo; U is a nucleophilic group, such as, nitro or cyano; and Z' has the same meaning given in formula (III) above. It will be understood that said $R^{43}$ may be ortho, meta or para to said

In preferred compounds of this type, U is cyano and $R^{43}$ is —$CO_2R^{46}$.

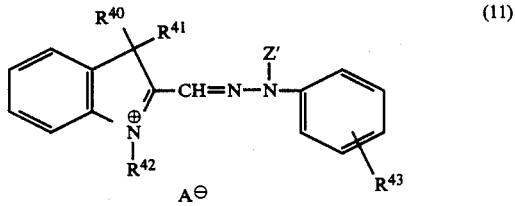

(11)

wherein $R^{40}$, $R^{41}$, $R^{42}$, $R^{43}$ and Z' have the same meaning given above and $A^{\ominus}$ is an anion

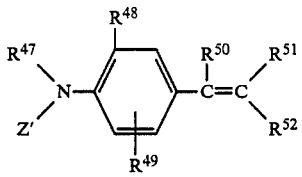
(12)

wherein $R^{47}$ is alkyl usually having 1 to 6 carbon atoms, phenyl, phenyl substituted with alkyl usually having 1 to 4 carbon atoms or halo, such as, chloro or bromo;

$R^{48}$ and $R^{49}$ each are hydrogen or alkyl usually having 1 to 6 carbon atoms; $R^{50}$ is hydrogen, alkyl usually having 1 to 6 carbon atoms, alkoxy usually having 1 to 6 carbon atoms or an electron-withdrawing group; $R^{51}$ and $R^{52}$, the same or different, each are electron-withdrawing groups; $R^{47}$ and $R^{48}$ taken together represent the carbon atoms to form a 5- or 6-membered N-heterocyclic ring, such as, an indolino ring; $R^{51}$ and $R^{52}$ taken together represent a 5- or 6-membered heterocyclic ring, such as, a rhodanine ring; and $Z'$ has the same meaning given in formula (III) above. By electron-withdrawing group is meant a group having a positive sigma value according to Hammett's Equation. Examples of preferred electron-withdrawing groups include nitro, cyano, carboxy, —$CONR^{53}R^{54}$ wherein $R^{53}$ and $R^{54}$ each are hydrogen or alkyl usually containing 1 to 6 carbon atoms, —$COR^{55}$ wherein $R^{55}$ is alkyl usually having 1 to 6 carbon atoms, phenyl or phenyl substituted with alkyl usually having 1 to 4 carbon atoms; and —$SO_2NR^{56}R^{57}$ wherein $R^{56}$ and $R^{57}$ each are hydrogen, alkyl usually having 1 to 6 carbon atoms or benzyl.

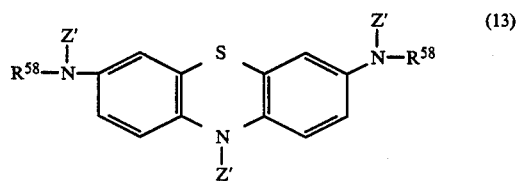
(13)

wherein each $R^{58}$, the same or different, is alkyl usually containing 1 to 20 carbon atoms or

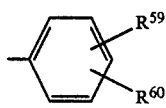

wherein each $R^{59}$, the same or different, and each $R^{60}$, the same or different, are hydrogen, alkyl usually having 1 to 6 carbon atoms; alkoxy usually having 1 to 6 carbon atoms, halo, such as, chloro or bromo; —$SO_2R^{61}$ is alkyl usually having 1 to 6 carbon atoms, phenyl or phenyl substituted with alkyl usually having 1 to 4 carbon atoms; carboxy; —$CONR^{62}R^{63}$ wherein $R^{62}$ and $R^{63}$ each are hydrogen or alkyl usually having 1 to 6 carbon atoms; $CO_2R^{64}$ wherein $R^{64}$ is alkyl usually having 1 to 6 carbon atoms or phenyl; cyano; nitro; trihalomethyl, such as trichloromethyl or trifluoromethyl; —$COR^{65}$ wherein $R^{65}$ is amino, alkyl usually having 1 to 6 carbon atoms or phenyl; —$NR^{66}R^{67}$ wherein $R^{66}$ and $R^{67}$ each are hydrogen or alkyl usually having 1 to 6 carbon atoms or —$SO_2$—$NR^{68}R^{69}$ wherein $R^{68}$ and $R^{69}$ each are hydrogen, alkyl usually having 1 to 6 carbon atoms or benzyl; and $Z'$ has the same meaning given in formula (III) above.

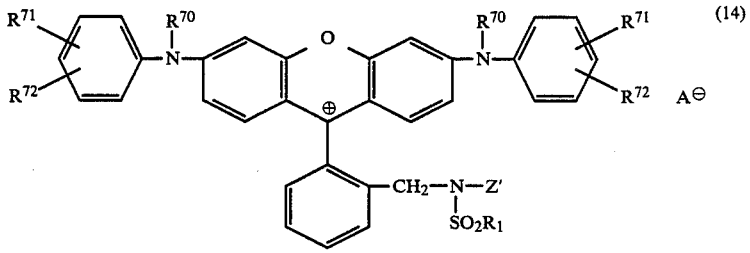
(14)

wherein each $R^{70}$ the same or different, is alkyl usually containing 1 to 20 carbon atoms; each $R^{71}$ the same or different, and each $R^{72}$, the same or different, are hydrogen, alkyl usually having 1 to 6 carbon atoms; alkoxy usually having 1 to 6 carbon atoms; halo, such as, chloro or bromo; —$SO_2R^{73}$ wherein $R^{73}$ is alkyl usually having 1 to 6 carbon atoms, phenyl or phenyl substituted with alkyl usually having 1 to 4 carbon atoms; carboxy; —$CONR^{74}R^{75}$ wherein $R^{74}$ and $R^{75}$ each are hydrogen or alkyl usually having 1 to 6 carbon atoms; —$CO_2R^{76}$ wherein $R^{76}$ is alkyl usually having 1 to 6 carbon atoms or phenyl; cyano; nitro; trihalomethyl, such as trichloromethyl or trifluoromethyl; —$COR^{77}$ wherein $R^{77}$ is amino, alkyl usually having 1 to 6 carbon atoms or phenyl; —$NR^{78}R^{79}$ wherein $R^{78}$ and $R^{79}$ each are hydrogen or alkyl usually having 1 to 6 carbon atoms or —$SO_2$—$NR^{80}R^{81}$ wherein $R^{80}$ and $R^{81}$ each are hydrogen, alkyl usually having 1 to 6 carbon atoms or benzyl; $R_1$ is alkyl usually having 1 to 4 carbon atoms; $A^{\ominus}$ is an anion; and $Z'$ has the same meaning given in formula (III) above. It will be understood that said $^{71}$ and $R^{72}$ may be ortho, meta or para to said N atom.

The compounds set out in formulae (1) to (3) above are known and their use in photographic products and processes as alkali-bleachable light-screening dyes, for example, antihalation and color correction filter dyes forms the subject matter of U.S. Pat. Nos. 4,304,833, 4,304,834 and 4,258,118, respectfully. It will be appreciated that the 2-sulfo and the 2,7-di-sulfo-substituted xanthenes of formula (2) that are disclosed in U.S. Pat. No. 4,304,834 also may be employed in the present invention and that the 2-sulfo and 2,7-di-sulfo-substituted indolinyl xanthenes disclosed and claimed as photographic light-screening dyes in U.S. Pat. No. 4,258,119 also are useful.

The compounds of formulae (4) to (14) represent novel compounds of the present invention and may be synthesized in a conventional manner. For example, the compounds of formulae (4) and (4a) may be synthesized by treating a 3,3-disubstituted-2,3-dihydrobenz[d]isothiazole-1,1-dioxide with potassium or sodium hydride to generate the sulfonamide anion for reaction with a t-alkyl chloroformate to yield the corresponding N-t-alkoxycarbonyl-substituted compound. The N atom of said N-t-alkoxycarbonyl is then alkylated using an alkyl iodide or other suitable alkylation agent to yield the final product. The 3,3-disubstituted-2,3-dihydrobenz[d]isothiazole-1,1-dioxides employed as the starting materials are known compounds and form the subject matter of U.S. Pat. No. 4,191,689 (where the 3,3-substituents ultimately comprising the A and B moieties are the same) and of U.S. Pat. No. 4,311,839 where the 3,3-substituents ultimately comprising the A and B moieties are different).

The compounds of formulae (5), (6) and (8) may be synthesized by treating leuco intermediates of the general structure

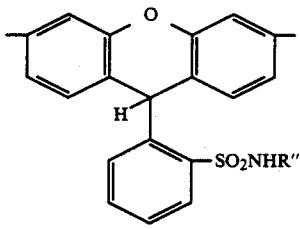

with potassium or sodium hydrides and then reacting with, for example, a di-tert-alkyl dicarbonate, an N-(t-alkoxycarbonyloxy) phthalimide or a halo-substituted-t-alkoxycarbonyl chloride to form the corresponding N-t-alkoxycarbonyl intermediate followed by oxidation using, for example, p-chloranil to give the final product. The oxidation step also may be carried out electrochemically. Leuco intermediates useful as the starting materials for the compounds of formulae (5) and (6) and the synthesis thereof are disclosed in U.S. Pat. Nos. 4,258,118 and 4,304,834, respectively, and also in U.S. Pat. No. 4,416,971. Dyes useful in forming the leuco intermediates for the compounds of formula (5) form the subject matter of U.S. Pat. No. 4,405,788.

The compounds of formula (7) also may be synthesized from an alkylsulfonamide leuco intermediate in the same manner as described for the compounds of formulae (5), (6) and (8). The leuco intermediate may be prepared by reducing a fluoran starting material to the alcohol, converting the alcohol to the bromo-methyl subtituted compound with hydrogen bromide and then reacting the ammonia and a sulfonyl chloride to give the leuco intermediate. Alternatively, the bromo-methyl compound may be reacted with the salt of a substituted sulfonylcarbamate. Fluoran dyes are well known in the art and typical dyes useful as starting materials for the compounds of formula (7) are disclosed in U.S. Pat. No. 3,959,571.

The compounds of formula (9) may be synthesized by treating the starting rhodamine with sodium or potassium hydride and then reacting with, for example, a di-tert-alkyl dicarbonate to form the final product. Where $R^{28}$ is alkyl rather than Z', the rhodamine starting material, after treating with the hydride is reacted with an alkyl halide and then with the di-tert-alkyl dicarbonate. Various 9-phenylxanthenes including rhodamines useful as the starting materials have been disclosed in the art, for example, in Venkataraman, K., *The Chemistry of Synthetic Dyes*, Academic Press, Inc., New York, 1952, pp. 746–754.

The compounds of formulae (10) and (11) may be synthesized, for example, by coupling the diazonium salt of an appropriately substituted aniline with a 1,3,3-trialkyl-2-methyleneindoline to give the corresponding 2-formyl-1,3,3-trialkyl-(3H)-indolinium chloride phenyl hydrazone intermediate which is then used for subsequent reaction. For the compounds of formula (10), the hydrazone intermediate is reacted with potassium cyanide to give the corresponding 2-cyano hydrazone followed by reaction with a di-tert-alkyl dicarbonate to give the final product. To prepare compounds with different nucleophilic groups, U, the cyano group may be replaced by reacting the 2-cyano-hydrazone product in the dark with a silver salt providing the desired U substituent, for example, silver nitrite. For the compounds of formula (11), the 2-cyano-hydrazone products of formula (10) are reacted with the appropriate silver salt to provide the desired anion, $A^{\ominus}$. The synthesis of the above-denoted intermediates and of the diazocarbocyanines produced therefrom is well known and described in Gordon, P. F. and Gregory, P., Organic Chemistry in Colour, Berlin-Heidelberg-New York, Springer-Verlag, 1983, page 87 and in Japanese application, laid-open No. 34719/72, laid-open date Nov. 22, 1972.

The compounds of formulae (12) and (13) may be synthesized by treating a benzylidene dye or a thiazine dye, respectively, with potassium or sodium hydride to generate the nitrogen anion followed by reaction with, for example, a di-tert-alkyl dicarbonate to give the final products. Benzylidene and thiazine dyes are well known classes of dyes and various dyes of these types have been disclosed. For example, various benzylidene dyes and their synthesis is disclosed in U.S. Pat. No. 3,728,374, and various thiazine dyes and their synthesis is described in Venkataraman, K., The Chemistry of Synthetic Dyes, Academic Press, Inc., New York, 1952, pp. 791–795.

The compounds of formula (14) may be prepared in the same manner as the compounds of formula (7) using the desired rhodamine as the starting material.

The anion $A^{\ominus}$ associated with the compounds of formulae (2), (3), (5), (6), (7), (8), (11) and (14) may be any single atomic ion or ionic group composed of a plurality of atoms having a negative charge, for example, halide, such as chloride, bromide or iodide, nitrate, tetrafluoroborate, perchlorate, periodate, acetate, oxalate, tosylate, sulfate, methane sulfonate, methane hydrogen disulfonate, m-benzene hydrogen disulfonate, trifluoroacetate, hexafluoroacetate, hexafluorophosphorate, azide or trifluoromethanesulfonate.

The following examples are given to further illustrate the present invention and are not intended to limit the scope thereof.

EXAMPLE 1

Preparation of the compound having the formula

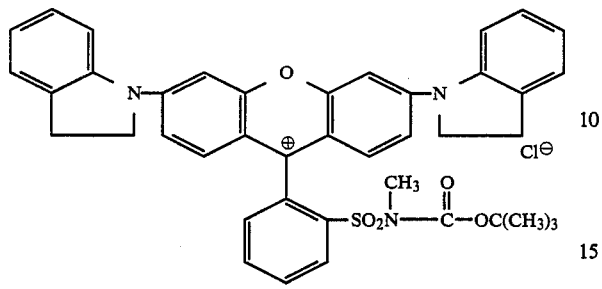

Compound A having the following formula

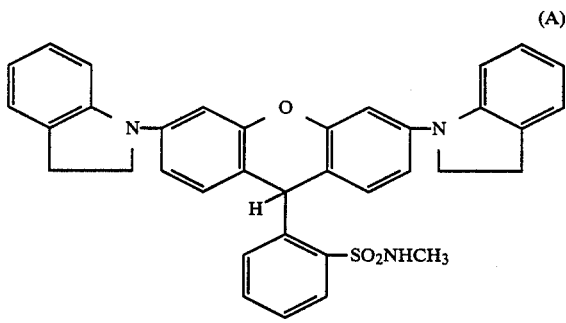

was used as the starting material in step (a) below.

(a) Compound A (7.5 g, 0.013 mole) was dissolved in 100 ml of dry tetrahydrofuran. The solution was cooled to 5°–10° C. and sodium hydride (0.54 g, 0.014 mole, 60% oil dispersion) was added portionwise. After the addition was complete, the mixture was stirred for 1.5 hours warming to 20° C. The pale green solution was cooled to 10° C. and di-tert-butyl dicarbonate (3.35 g, 0.015 mole) in 30 ml of tetrahydrofuran was added dropwise over one-half hour. The reaction mixture was then stirred at room temperature for one-half hour. TLC showed no more starting compound A and one new spot. The reaction mixture was filtered through Celite and evaporated to dryness to give 8.23 g (92% yield) of the t-butoxycarbonyl-substituted leuco dye having the formula

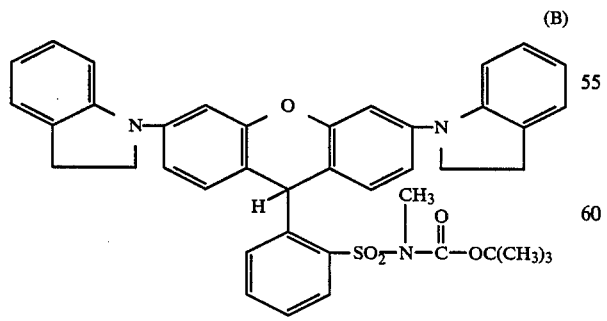

(b) The leuco dye prepared above (70 mg., 0.102 mmole) was dissolved in dry methylene chloride (3 ml) and p-chloranil (2 equivalents, 50 mg) was added. A few drops of methanol were added to aid solubility and the mixture was allowed to stir at room temperature until TLC (methylene chloride/hexane 2:1) showed that consumption of starting material was complete (2 hours). The solvents were evaporated and the residue triturated well with ethyl acetate and toluene to remove excess p-chloranil. The crude xanthene was then redissolved in methylene chloride, and one equivalent of distilled trimethylchlorosilane (13 µl) was added all at once. TLC (3% methanol in methylene chloride) showed a quantitative change in $R_f$ of the cyan spot in 3–5 minutes, and the reaction mixture was evaporated and subjected to high vacuum.

The crude dye product was applied to a flash silica gel column with methylene chloride to remove non-dye impurities. Further elution with 5% methanol in methylene chloride and collection of appropriate fractions gave 35 mg (48%) of the title compound. NMR was consistent with the proposed structure. $\lambda_{max}$ 665 nm/Epsilon 68,000 as measured in methanol.

Compound A was synthesized according to the procedure set forth in Example 1 of U.S. Pat. No. 4,258,118.

As a further proof of structure, the ring-closed form of the title compound having the formula

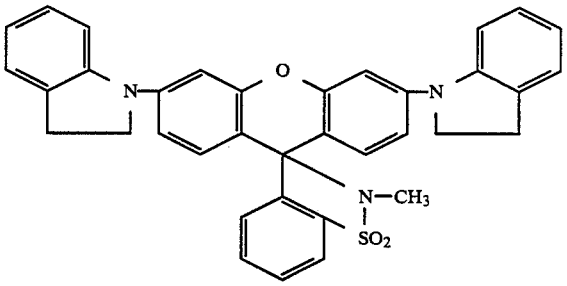

was prepared as follows:

The cyan dye synthesized in Example 1 (70 mg, 0.097 mmole) was dissolved in 2 ml N-methylpyrrolidinone and immersed with stirring into a pre-heated 180° C. oil bath. Stirring was continued, and over the next several minutes, gas evolution was noted and the mixture lessened in color noticeably. After 5 minutes the mixture was allowed to cool and then poured into ice water. The precipitate was centrifuged, washed with water, centrifuged again, dissolved in methylene chloride, dried over sodium sulfate and evaporated. No cyan color was noted in solution, although some discoloration was noted. The residue from high vacuum pumping weighed 60 mg (105% of theory) and showed a small dark spot at the origin with only one mobile UV active spot ($R_f$ 0.8, methylene chloride, silica gel). A short column of silica gel eluted with methylene chloride gave a clear solution from which 46 mg (81% of theory) of a pale cyan film was obtained upon evaporation. NMR was consistent with the proposed ring-closed structure.

EXAMPLE 2

Preparation of the compound having the formula

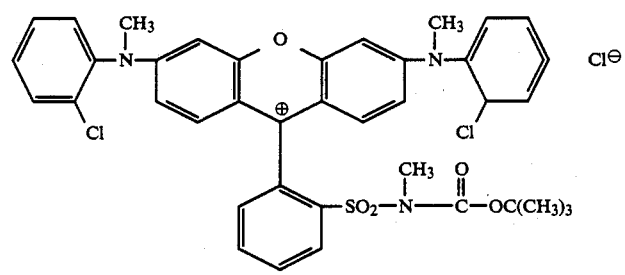

(D)

Compound C having the following formula

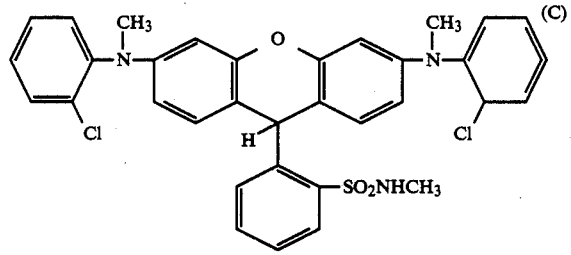

(C)

was used as the starting material in step (a) below.

(a) Potassium hydride (83 mg, 2.07 mmole, 1.3 equivalents, washed with hexane, dried under nitrogen) was stirred as a slurry in dry tetrahydrofuran under nitrogen, and a dry tetrahydrofuran solution of Compound C (1.00 g, 1.59 mmole) in 5 ml tetrahydrofuran was added dropwise via syringe at room temperature. The mixture was allowed to sit until effervescence ceased (about 10 minutes) and then a dry tetrahydrofuran solution of N-(t-butoxycarbonyloxy) phthalimide (417 mg, 1.0 equivalent) was added dropwise. Though the reaction mixture turned dark red shortly, TLC (hexane/methylene chloride 1:2) indicated a clean reaction. After 2 hours at room temperature, small additional portions of potassium hydride and the phthalimide reagent were introduced as solids, and after 4 hours, the mixture was filtered through Celite and evaporated to give 1.28 g of foam. Chromatography (flash, silica gel, methylene chloride/hexane 2:1) gave a one spot product, 804 mg (69% yield) of the t-butoxycarbonyl-substituted leuco dye having the formula

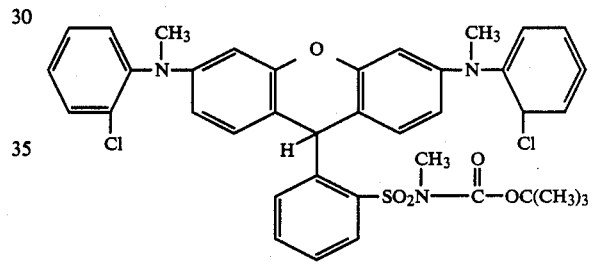

(b) The leuco dye prepared above (800 mg, 1.09 mmole) was dissolved in 15 ml of methylene chloride/methanol (approximately 10:1), and p-chloranil (2.0 equivalents, 2.19 mmole, 538 mg) was added all at once. The mixture was allowed to stir at room temperature until no leuco dye was seen on TLC (about 2 hours). Following evaporation and high vacuum pumping, the residue was triturated with ethanol (3 times) and filtered to remove most of the excess chloranil.

The residue was again evaporated under high vacuum, re-dissolved in dry methylene chloride and allowed to stir at room temperature as one equivalent of freshly distilled trimethylchlorosilane (118 mg, 140 μl) was introduced all at once. After 10 minutes at room temperature, this mixture was evaporated and the residue subjected to flash chromatography on a short silica gel column. Impurities were removed by successive elutions with methylene chloride.

The desired dye product was eluted with 10% methanol in methylene chloride to give 630 mg of the title compound. TLC showed one major spot with a slight contaminant. NMR showed the t-butoxycarbonyl group intact. $\lambda_{max}$ 552 nm/Epsilon 86,500 as measured in methanol.

Compound C was synthesized according to the procedures set forth in U.S. Pat. No. 4,304,834 and Example 6 of U.S. Pat. No. 4,416,971.

EXAMPLE 3

Preparation of the compound having the formula

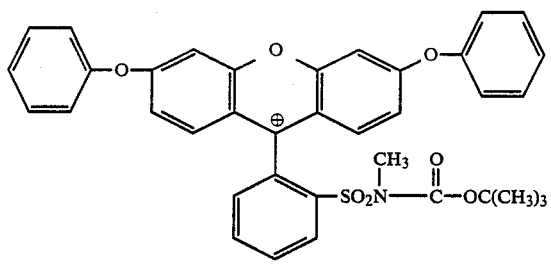

Compound E having the following formula

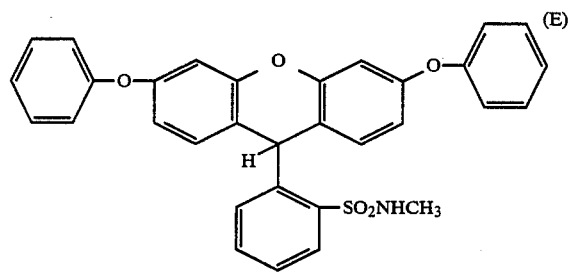

was used as the starting material in step (a) below.

(a) Compound E (176 mg, 0.33 mmole) dissolved in 4 ml of dry tetrahydrofuran was treated with sodium hydride (1.2 equivalents of 50% oil dispersion, 21 mg) until effervescence ceased (about 0.5 hour). A tetrahydrofuran solution of N-(t-butoxycarbonyloxy)phthalimide (1.2 equivalents, 112 mg) was added dropwise with stirring at room temperature under nitrogen and the mixture was allowed to stir overnight. The tetrahydrofuran was evaporated and the residue partitioned with methylene chloride/aqueous bicarbonate. After mutual back extractions, the organic layer was dried and evaporated to give a foam which showed essentially one spot on TLC at higher $R_f$ than the starting material. A short flash column chromatography gave 200 mg (96% yield) of the desired t-butoxycarbonyl-substituted leuco dye of the following formula as a white foam.

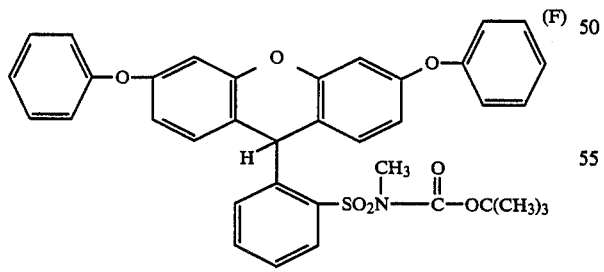

(b) The oxidation of the leuco dye material obtained in step (a) was efficiently and quantitatively realized by electrochemical oxidation in acetonitrile solvent in the presence of tetrafluoroborate. After evaporation of the solvent and removal of excess salts by partitioning between methylene chloride and water, the methylene chloride layer was dried and evaporated to give the title compound as very pure dye by NMR. $\lambda_{max}$ 451 nm/Epsilon 43,300 as measured in acetonitrile.

A sample of the title compound dissolved in N,N-dimethylformamide and heated at 175° C. for several minutes darkened considerably but the water precipitated solids showed loss of the t-butoxycarbonyl group by nmr and resonances expected for the ring-closed material.

Compound E used as the starting material in step (a) above was prepared as follows:

(i) 3,6-Dichlorosulfofluorescein (3.0 g, 7.40 mmole) and 4 equivalents of sodium phenolate (3.44 g, 29.6 mmole) were combined in approximately 6 ml of dry N-methylpyrrolidinone and stirred under nitrogen at 110° C. for 2 hours. The mixture was heated to 160° C. briefly, allowed to cool and poured slowly into a mixture of ice and 1N hydrochloric acid with good stirring. The precipitate was filtered off, washed well with water, taken up in methylene chloride, dried over sodium sulfate, filtered and evaporated.

The material was subjected to flash chromatography on silica gel using successive elutions of methylene chloride with 2% methanol, 5% methanol and 10% methanol. The 5% methanol in methylene chloride elution gave the purest band of the compound of the formula

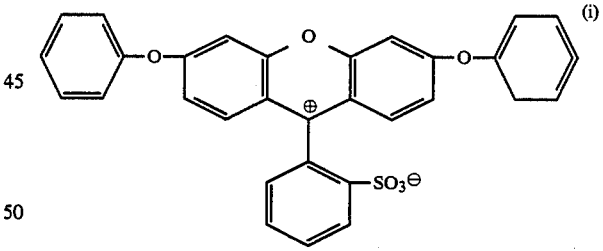

having a bright yellow spot at $R_f$ 0.35 (3% methanol in methylene chloride) 1.28 g (33% yield), $\lambda_{max}$ 440 nm as measured in methanol.

(ii) Compound (i) (1.28 g, 2.46 mmole) was dissolved in phosphorus oxychloride (20 ml) and treated with stirring at 60° C. for 4 hours (drying tube). Most of the phosphorus oxychloride was evaporated in vacuo and the residue was evaporated from toluene one time. Following a brief high vacuum pumping, the residue was dissolved in methylene chloride and allowed to stir vigorously with an equal amount of conc. ammonium hydroxide for several hours (approximately 50 ml each). The organic layer was separated, the aqueous phase extracted again with methylene chloride and the combined organic phases washed with brine and dried over sodium sulfate.

Following evaporation, the residue was subjected to flash chromatography on silica gel using methylene chloride as eluent. 700 mg (55% yield) of pure compound of the formula

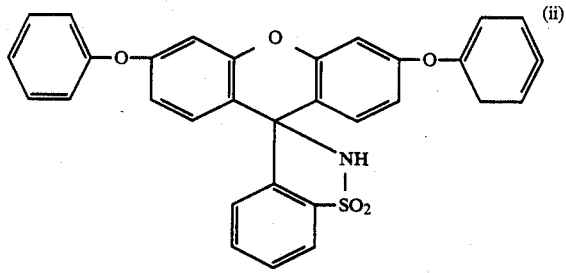

was collected, only slightly contaminated with a higher running spot, yellow in color, which gives solutions of the product a mildly fluorescent appearance. NMR for compound (ii) was consistent with the proposed structure.

(iii) Compound (ii) (300 mg, 0.58 mmole) was dissolved in methylene chloride (3 ml), and 3 ml of 1N sodium hydroxide was added. A five fold excess of iodomethane (0.2 ml) was then added and the mixture stirred vigorously. A few crystals of tetrabutyl ammonium chloride catalyst were added and vigorous stirring continued. After 20 minutes, TLC showed complete conversion to the N-methylated compound of the formula

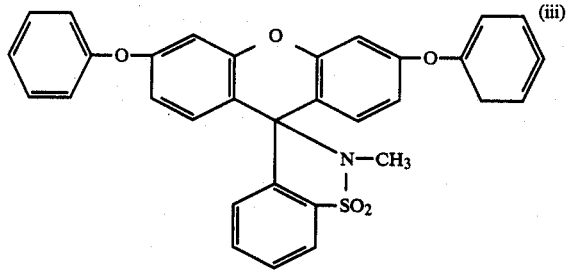

The methylene chloride layer was separated, washed with water, brine, dried over sodium sulfate and evaporated. NMR of the residue showed contamination only by a small amount of catalyst which could be removed by filtration through a silica gel plug.

(iv) Compound (iii) (170 mg, 0.32 mmole) was dissolved in 6 ml of ethylacetate and approximately 100 mg methanesulfonic acid and 1 ml water were added. The mixture was brought to gentle reflux under nitrogen and approximately 300 mg of powdered zinc were added in portions over the next hour. After further reflux for an additional hour (solution goes yellow→ pale red→yellow), TLC showed that reduction was complete. After cooling, the mixture was filtered and evaporated. The residue was dissolved in methylene chloride and carefully extracted with aqueous bicarbonate. The methylene chloride layer was dried and evaporated to give Compound E virtually pure by NMR.

EXAMPLE 4

Preparation of the compound having the formula

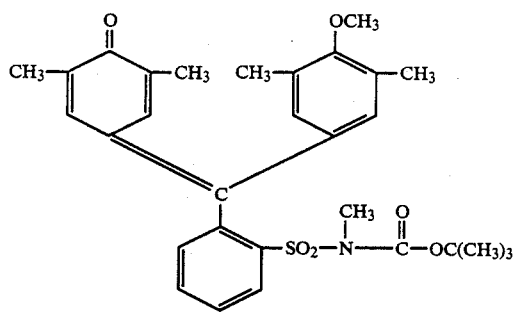

Compound G having the formula

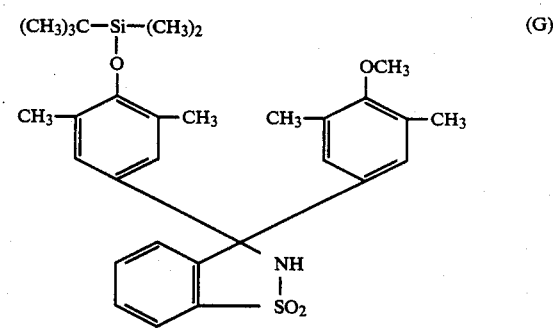

was employed as the starting material in step (a) below.

(a) Compound G (950 mg, 1.76 mmole) was allowed to stir in dry tetrahydrofuran at room temperature for 2 hours with 30% excess of potassium hydride (100 mg) to generate the sulfonamide anion. A pale pink solution resulted.

Meanwhile an excess (approximately 20 fold) of t-butyl chloroformate for reacting with the sulfonamide anion was prepared as follows:

t-Butanol (1.31 g, 17.6 mmole) was dissolved in dry tetrahydrofuran (10 m) and cooled to 0° C. with stirring under nitrogen. Two equivalents of phosgene (3.5 g, 35 mmole, 28 ml of 12.5% solution in benzene) were then added dropwise over a period of 10 minutes. Pyridine (1 equivalent, 1.4 ml) was then added dropwise and the mixture allowed to stir at 0° C. for 2.5 hours. The precipitate was filtered and the filtrate evaporated in vacuo below room temperature. The residue was dissolved in tetrahydrofuran and added dropwise to the room temperature solution of the sulfonamide anion. This mixture was allowed to stir at room temperature for 2 hours to give a pale yellow solution. The solvent was evaporated and the residue chromatographed (flash, SiO2, methylene chloride) to give partial resolution of 2 spots of close $R_f$. The upper spot proved to be the desired N-t-butoxycarbonyl-substituted compound, 388 mg (35% yield).

(b) Tetraethylammonium fluoride was dried by azeotroping in benzene for 2 hours (Dean Stark trap) followed by evaporation and high vacuum pumping. The compound prepared in step a (385 mg, 0.6 mmole) was dissolved in dry tetrahydrofuran (15 ml) and 2 equivalents of methyl iodide (172 mg, 75 ml) was added with stirring under nitrogen at room temperature. The previously dried tetraethylammonium fluoride (30 mg, 2.5 equivalents) was then introduced and the mixture allowed to stir vigorously at room temperature. A yellow color was noted immediately and after stirring overnight, TLC (methylene chloride/acetone 9:1) showed no starting material; the product was a pale yellow spot at slightly lower $R_f$. The mixture was filtered, evaporated and placed under high vacuum for 10 minutes. The crude material was filtered through a silica gel pad with methylene chloride/acetone to remove quaternary salts and evaporated to give 336 mg of yellow foam, one spot on TLC in three different solvent systems. NMR and IR were consistent with the proposed structure. $\lambda_{max}$ 380 nm/Epsilon 19,700 as measured in N,N-dimethylformamide.

Compound G used as the starting material in step (a) above was synthesized in a known manner as disclosed, for example, in aforementioned U.S. Pat. Nos. 4,191,689 and 4,311,839.

EXAMPLE 5

Preparation of the compound having the formula

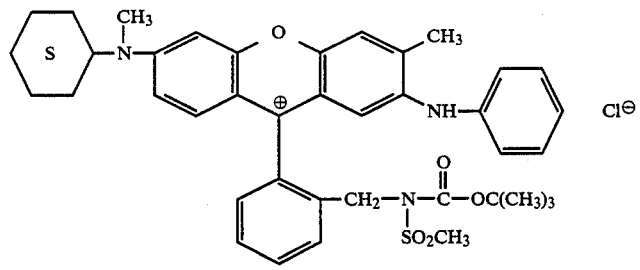

Compound H having the formula

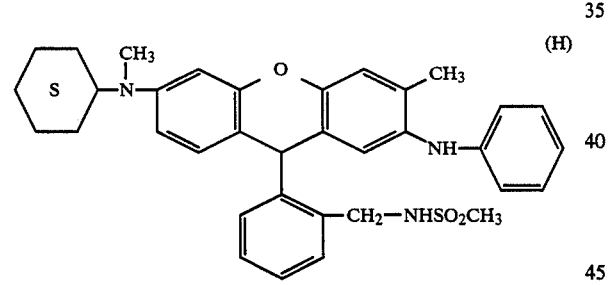

was used as the starting material in step (a) below.

(a) Compound H (1.65 g, 2,83 mmole) was dissolved in dry tetrahydrofuran (25 ml) under nitrogen and sodium hydride (163 mg of 50% oil dispersion, 1.2 equivalents) was added all at once at room temperature with stirring. Evolution of hydrogen proceeded at a rather slow rate and stirring was continued until judged nearly complete (1.5 hours).

A dry tetrahydrofuran solution of N-(t-butoxycarbonyloxy)phthalimide (1.1 equivalents, 3.11 mmole, 819 mg) was then added dropwise and the darkening solution was allowed to stir overnight at room temperature. TLC (methylene chloride) showed good product formation; the mixture was evaporated in vacuo using a large flask and the residue partitioned well with methylene chloride and aqueous bicarbonate.

Combined organic layers were washed with brine, dried over sodium sulfate and evaporated to a foam, 2.17 g. After high vacuum pumping, the material was dissolved in the minimum amount of methylene chloride and a rapid precipitation of a grey solid resulted, 670 mg. This solid proved to be substantially pure t-butoxycarbonyl-substituted leuco dye having the following formula as determined by TLC and NMR.

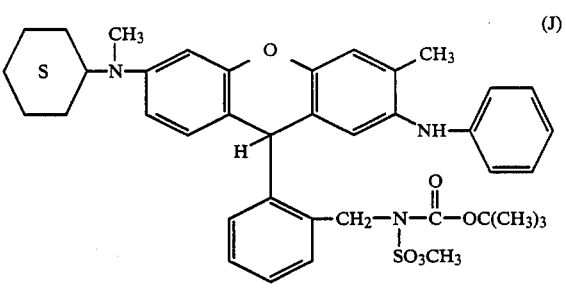

(b) The leuco dye prepared above (670 mg, 0.98 mmole) was stirred in methylene chloride/methanol (15 ml of about 10:1) and chloranil (2 equivalents, 1.96 mmole, 483 mg) was added at room temperature. Stirring was continued until TLC (methylene chloride) showed no leuco dye remaining (2.5 hours). The mixture was evaporated and the residue triturated well with toluene to remove excess chloranil. The residue was subjected to high vacuum for one-half hour and then dissolved in dry methylene chloride. Trimethyl silyl chloride (1.2 equivalents, 150 μl) was added and the mixture allowed to stir at room temperature for one-half hour before being evaporated again.

The residue was chromatographed on a flash silica gel column using, in sequence, methylene chloride, 3% methanol in methylene chloride and 6% methanol in methylene chloride. The 3% methanol wash eluted some colorless, ring-closed material. The 6% methanol elution gave fractions containing the desired product as dark green-black solutions. Evaporation and pumping gave the title compound as a black solid, 400 mg. (57% yield). NMR was consistent with the proposed structure. $\lambda_{max}$ 455 nm/Epsilon 15,400—$\lambda_{max}$ 605 nm/Epsilon 15,700 as measured in methanol.

Compound H used as the starting material in step (a) above was synthesized as follows.

(v) 3-(N-methyl-N-cyclohexylamino)-6-methyl-7-anilinofluoran (8.0 g, 15.5 mmole) was dissolved in 200 ml dry tetrahydrofuran and stirred at room temperature while boron trifluoride etherate (8.8 g, 6.6 ml, 61 mmole) was added. The intitially clear solution became greenish-black due to the open carboxylate form of the dye. Sodium borohydride (1.82 g, 48 mmole) was then added and the mixture allowed to stir at room temperature under nitrogen (initial ice bath cooling). The mixture slowly evolved gas and began to lighten in color after about 15 minutes. After stirring at room temperature for 3 hours, TLC showed complete reaction (aliquot quenched with dilute hydrochloric acid and extracted into methylene chloride).

The reaction mixture was quenched by pouring into 600 ml of water containing 25 ml of conc. hydrochloric acid. After thorough shaking, the product precipitated as a greenish oil. The supernatant was decanted and extracted with methylene chloride in a separatory funnel and these extracts combined with a methylene chloride solution of the oily precipitate. The methylene chloride solution was washed with brine, dried over sodium sulfate and evaporated. The concentrated solution was filtered through a small silica pad with methylene chloride and tetrahydrofuran to remove an origin impurity and the filtrate evaporated to 5.8 g (74% yield) of crude product comprising the compound of the following formula as a pale green-grey foam.

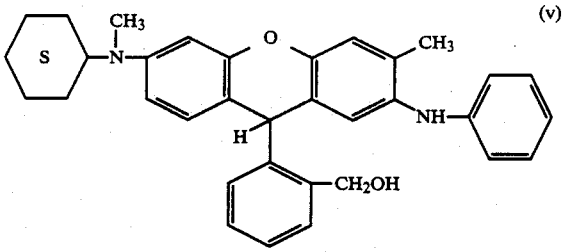
(v)

(vi) The crude product obtained in step (v) above (5.8 g, 11.5 mmole) was dissolved in methylene chloride (100 ml) and the mixture purged with nitrogen with ice bath cooling. HBr gas was then introduced and the mixture allowed to stir in the cold. The course of the reaction was followed by TLC on silica using methylene chloride as eluent. After 0.8 hour, all of compound (v) had been consumed. After a further 10 minutes of stirring, the mixture was carefully added with shaking to approximately 300 ml of saturated sodium bicarbonate solution in a large Erlenmeyer. The pale orange solution reverted to greenish grey and the phases were separated in a separatory funnel. The aqueous phase was washed with methylene chloride, the combined organic phases washed with bicarbonate, brine, dried over sodium sulfate and evaporated. After high vacuum, the crude product comprising the compound of the following formula was obtained as a pale greenish-grey solid, 5.8 g (90% yield).

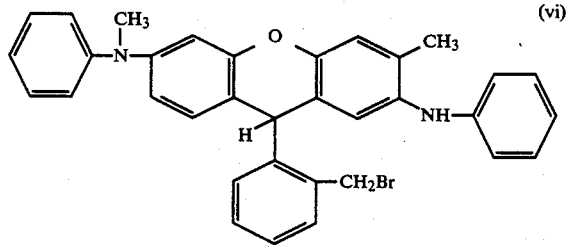
(vi)

(vii) The crude material obtained in step (vi) above (3.8 g, 6.7 mmole) was added in one portion to 250 ml of methanol previously saturated with ammonia gas and the mixture left to stir at room temperature overnight. After this time, some solids were still not dissolved and TLC (methylene chloride/hexane/1:1) confirmed the presence of the starting material. The temperature of the mixture was raised to 50° C. with an oil bath as fresh ammonia was admitted with constant stirring. After about 4 hours, all solids had dissolved and again the solution was allowed to stir at room temperature overnight.

TLC showed no starting material, so the mixture was purged with nitrogen and evaporated to dryness. High vacuum pumping left 3.6 g of crude residue which was dissolved in dry pyridine (25 ml), and 1.8 equivalents of methanesulfonyl chloride was added (12 mmole, 0.9 ml). This mixture was allowed to stir at room temperature overnight and then most of the pyridine was removed in vacuo. The residual oil was triturated well with cold 1N hydrochloric acid, the crude solid filtered, washed well with water, taken up in methylene chloride, washed with cold 1N hydrochloric acid, water, brine, dried over sodium sulfate and evaporated to give a foam. Chromatography on silica with methylene chloride followed by 10% ether in methylene chloride gave material which by NMR was of sufficient purity to be used as the starting material in Example 5 above.

The compound of Example 5 also was synthesized as follows:

Methanesulfonamide (4.0 g, 42 mmole), 6.96 g potassium carbonate and 11.0 g di-tert-butyl dicarbonate were refluxed in acetone for 8 hours, and the reaction mixture allowed to cool and then filtered. The crude product was triturated well with warm methanol to remove insoluble potassium carbonate and the methanol evaporated and subjected to high vacuum to give as pure product, the potassium salt of N-t-butoxycarbonyl-methanesulfonamide.

The leuco benzyl bromide compound of formula (vi) (10.2 g, 18 mmole) was dissolved in dry N-methylpyrrolidinone with the potassium salt of the sulfonamide prepared above (1.5 equivalents, 27 mmole, 6.29 g) and the mixture allowed to stir at room temperature overnight under a nitrogen atmosphere. An aliquot was withdrawn and injected into water to give a crude solid which showed nearly quantitative reaction by TLC (methylene chloride). The reaction mixture was poured into ice/water and the crude product filtered off and washed well with water. The material was taken up in methylene chloride, dried, concentrated and filtered through a short Florisil pad to give 11.0 g of grey solid upon evaporation. TLC showed only small impurities. Recrystallization from toluene/hexane gave compound J as off-white granular crystals, melting point 140° C. (dec.), 9.3 g (76% yield).

The leuco dye (Compound J) was converted to the dye product using the same procedure described in step b of Example 5 above.

EXAMPLE 6

Preparation of the compound having the formula

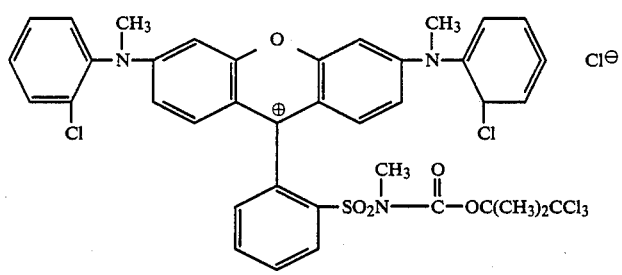

The starting material used in step (a) below was Compound C as used in Example 2 above.

(a) Compound C (2 g, 0.00317 mole) was dissolved in 25 ml of tetrahydrofuran under nitrogen. Sodium hydride (0.13 g, 0.00349 mole) was added and the mixture stirred for one hour at room temperature. To this solution 2,2,2-trichloro-tert-butoxycarbonyl chloride (1.14 g, 0.00475 mole) in 5 ml of tetrahydrofuran was added dropwise over 30 minutes. The reaction mixture was stirred at room temperature for 3 hours. TLC (ethyl acetate/n-hexane—25:75) showed only a small amount of starting Compound C. The reaction mixture was poured into water and extracted with methylene chloride. The methylene chloride was dried over sodium sulfate and evaporated to give a pink solid which was washed with hexane to yield 2.2 g of the corresponding trichloro-tert-butoxycarbonyl leuco dye.

(b) The leuco dye prepared above (1 g, 0.00119 mole) was dissolved in 10% methanol/methylene chloride and chloranil (0.5 g, 0.00203 mole) was added. The reaction mixture was stirred at room temperature for 3 hours. TLC (ethyl acetate/n-hexane—25:75) showed that no more of the leuco dye was present. The reaction mixture was precipitated into ether. The precipitate was collected, dissolved in methylene chloride and 0.5 ml of chlorotrimethylsilane was added and stirred for 30 minutes. The methylene chloride solution was stirred with 20 g of acidic alumina for 15 minutes. The alumina was filtered off and washed with 2.5% methanol/methylene chloride. The title compound was recovered in a yield of 0.80 g from the 2.5% methanol/methylene chloride wash.

The title compound (0.25 g) was dissolved in a minimum amount of N-methylpyrrolidinone and heated to 195° C. Samples were taken at 5, 10, 15, 20 and 30 minutes for thin layer analysis. TLC (silica gel using ethyl acetate/n-hexane—25:75) indicated that only a small amount of title compound was present after 15 minutes and that the product after heating was the ring-closed compound of the following formula, which structure was consistent with NMR.

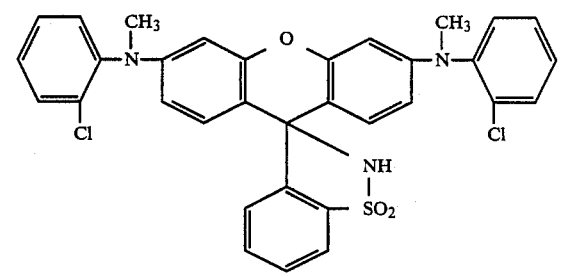

The above-denoted ring-closed compound and the corresponding N-methyl ring-closed compound were heated in N-methylpyrrolidinone and observed to remain colorless even at 200° C. The methyl compound after heating at 185°-195° C. for 50 minutes was found to be stable, that is, the N-methyl group remained intact.

EXAMPLE 7

Preparation of the compound having the formula

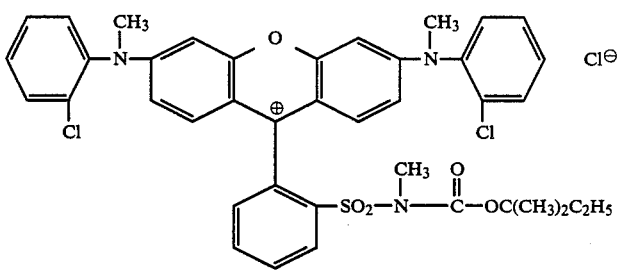

Compound C as set out in Example 2 was used as the starting material in step (a) below.

(a) Sodium hydride (50 mg of 50% dispersion in oil, 1.25 equivalents) was allowed to stir in dry tetrahydrofuran (5 ml) under nitrogen at room temperature as a dry tetrahydrofuran solution of Compound C (530 mg, 0.84 mmole) was added dropwise. Following the addition, the mixture was allowed to stir at room temperature for one-half hour to give a homogeneous pale yellow solution. To this solution was added dropwise, an excess of tertiary-amylchloroformate. The pink mixture was stirred at room temperature for 2 hours and TLC (methylene chloride/n-hexane 2:1) showed good product formation. The mixture was evaporated and the residue chromatographed (flash, silica gel, methylene chloride/n-hexane 2:1) to afford 600 mg (96% yield) of the leuco dye of the following formula as a white foam.

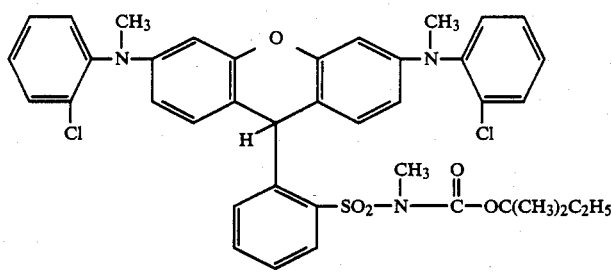

(K)

(b) The purified leuco dye (600 mg, 0.8 mmole) and p-chloranil (396 mg, 2 equivalents) were allowed to stir at room temperature in methylene chloride with a little methanol to aid solution. After 2 hours, TLC indicated that no starting material remained. The mixture was evaporated and the residue triturated well with toluene and ethyl acetate and the residues subjected to high vacuum pumping. The residue was dissolved in methylene chloride and trimethylsilylchloride (0.15 ml) was added. After room temperature stirring for 20 minutes, the mixture was evaporated. Chromatography on silica gel (flash) with methylene chloride followed by 2% methanol in methylene chloride and 5% methanol in methylene chloride gave 450 mg of title compound as purified dye. $\lambda_{max}$ 551 nm/Epsilon 87,500 as measured in methanol.

EXAMPLE 8

Preparation of the compound having the formula

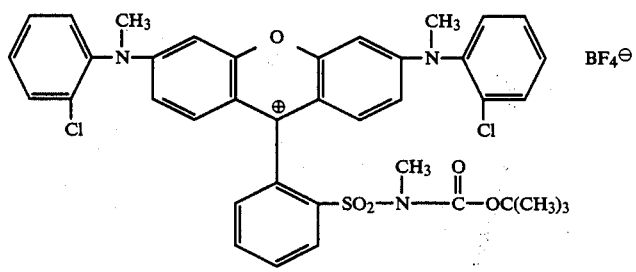

A sample of the leuco dye D prepared in Example 2 above was oxidized electrochemically in acetonitrile and $(CH_3)hd 4N^{\oplus}BF_4^{\ominus}$ as working electrolyte. The oxidation resulted in the formation of a significant amount of a purple impurity. Chromatography (flash, silica gel, 6% methanol/methylene chloride) gave substantially pure material. A sample of purified material was coated in polyvinyl-N-pyrrolidinone on a glass plate and one-half of the coated sample was heated on a heating platen. After one minute at 170° C. some density remained in the heated portion.

EXAMPLE 9

Preparation of the compound having the formula

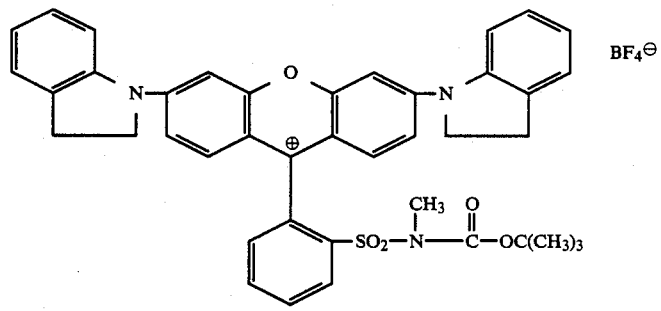

A sample of the leuco dye B prepared in Example 1 above was oxidized electrochemically in N,N-dimethylformamide using $(Bu)_4N^{\oplus}BF_4^{\ominus}$ as working electrolyte. The oxidation was not totally clean as a second cyan material was evident. Chromatography (flash, silica gel, 6% methanol/methylene chloride) gave a sample of good purity. As in Example 9, a sample of the compound was coated in polyvinyl-N-pyrrolidinone on a glass plate and one-half of the coated sample was heated on a heating platen. Again, some difficulty was encountered in obtaining an excellent $D_{min}$ when the coating was kept at 170° C. for 1–2 minutes.

EXAMPLE 10

Preparation of the compound having the formula

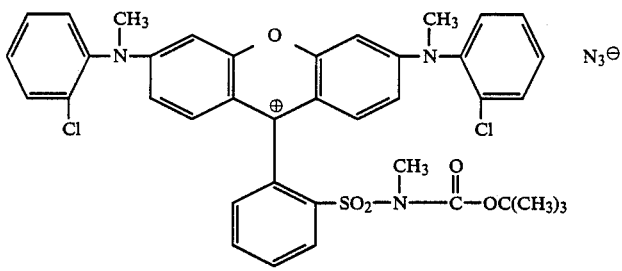

The leuco dye D as prepared in Example 2 (1.18 g, 1.61 mmole) was dissolved in methylene chloride with 2 equivalents of p-chloranil (795 mg, some methanol added to aid solubility) and allowed to stir at room temperature for 3 hours (no starting material remaining). The mixture was evaporated and the residue triturated well with ethyl acetate to remove the chloranil.

250 mg of this mixture was then taken up in methylene chloride and a 25% molar excess of trimethylsilyl azide (0.32 mmole, 40 µl) was added. After stirring at room temperature for 15 minutes, TLC showed little change in $R_f$ for the dye, but a new orange-brown lead spot (trimethylsilyl chloranil). After evaporation, a short flash silica gel chromatography using methylene chloride, then 3% methanol in methylene chloride and 6% methanol in methylene chloride gave a one spot product, 190 mg of magenta solid. NMR indicated high purity. $\lambda_{max}$ 552 nm/Epsilon 105,000 as measured in methanol.

EXAMPLE 11

Preparation of the compound having the formula

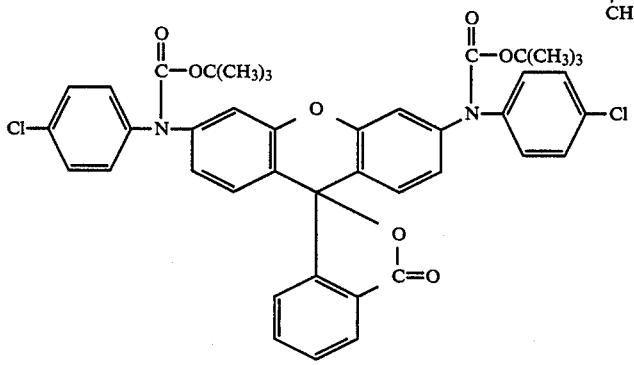

3′,6′-Bis(p-chloroanilino)fluoran (3.73 g, 0.0068 mole) was stirred in 50 ml dimethyl sulfoxide; sodium hydride (0.98 g of a 50% oil dispersion, 0.0204 mole) was added portion-wise over 20 minutes. A dark green mixture formed which was heated to 40° C. over 30 minutes. After cooling to room temperature, di-tert-butyl dicarbonate (4.45 g, 0.0204 mole) in 10 ml of dimethyl sulfoxide was added dropwise over 5 minutes; the mixture changing from dark green to red-orange. After heating at 40° C. for 3 hours, a second charge of 50% sodium hydride (0.49 g) was added, heating at 40° C. was extended for 3 more hours, followed by addition of a second charge of di-tert-butyl dicarbonate (8.90 g) and subsequent heating for 1 hour at 50° C.

The mixture was cooled to room temperature and cautiously poured into 250 ml of water with stirring; this mixture was extracted twice with 250 ml portions of ether. The ether extracts were combined and washed with five 200 ml portions of water, then set over sodium sulfate to dry. Filtration and evaporation of solvent left 6.8 g of a viscous red-orange syrup. This was subjected to high pressure column chromatography (silica gel, methylene chloride eluant). There was obtained 2.18 g pale pink, amorphous solid. This was recrystallized from 12:1-hexane:methylene chloride to provide 1.42 g jagged needles, which were crushed to a pale cream powder, m.p. 214°–215° C. (dec.); m/e 751; nmr (CDCl₃) supports the title structure.

EXAMPLE 12

Preparation of the compound having the formula

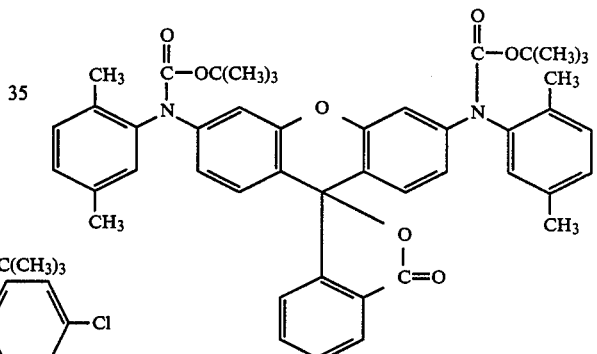

3′,6′-Bis(2,5-dimethylanilino)fluoran (20 g, 0.037 mole) in 175 ml dry dimethyl sulfoxide was treated portion-wise with sodium hydride (5.34 g 50% oil dispersion, 0.111 mole) over 1.5 hours. The mixture was heated to 45° C. for 2 hours, it became blue-green. Di-tert-butyl dicarbonate (24.23 g, 0.111 mole) in 25 ml dimethyl sulfoxide was added over 5 minutes producing a red-orange mixture. This was heated to 65° C. for 2.5 hours (caution: foaming may be encountered during early heating). After cooling to room temperature, the mixture was poured into 2 liters of ice-water, followed by filtration. The pasty solid, so obtained, was dissolved in methylene chloride and washed several times with water (sodium chloride added to break emulsions). After drying (Na₂SO₄), the methylene chloride extract was concentrated to a small volume and subjected to high pressure column chromatography (SiO₂; 90:10-cyclohexane/ethyl acetate eluant). There was obtained 5.4 g purified product as a faint orange amorphous solid.

The 3',6'-Bis(2,5-dimethylanilino)fluoran used above was synthesized as follows:

2,5-Dimethylaniline (78.5 g, 0.648 mole) was mixed with 3',6'-dichlorofluoran (59.8 g, 0.162 mole) in 300 ml of sulfolane. Anhydrous aluminum chloride (43.2 g, 0.324 mole) was added portion-wise over 45 minutes. The resulting mixture was heated to 150° C. for 2.5 hours, then poured into 2 liters of cold 10% hydrochloric acid. The pasty solid collected by filtration, was dissolved in ethyl acetate, the residual water removed and then the solvent evaporated. The residue was triturated repeatedly with ether to provide 45 g. of crude product, which was used in the above preparation without further purification.

EXAMPLE 13

Preparation of the compound having the formula

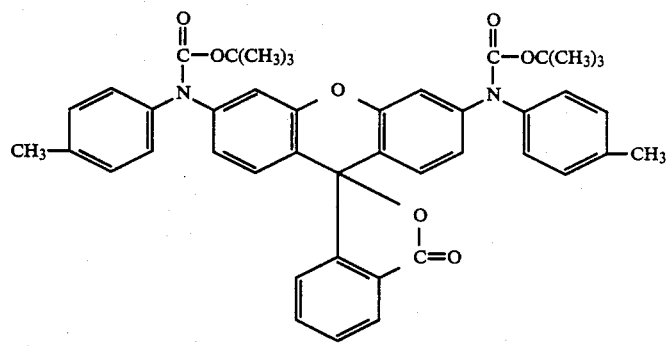

The title compound was prepared according to the procedure described in Example 11 above using 0.7 g of 3',6'-bis(p-methylanilino)fluoran, 3.5 equivalents of sodium hydride and 10 equivalents of di-tert-butyl dicarbonate and was obtained as a white solid (yield 1 g, melting range 196°-197° C.).

EXAMPLE 14

Preparation of the compound having the formula

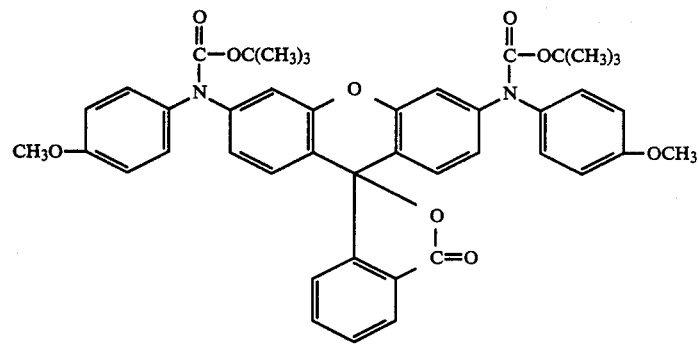

The title compound was prepared according to the procedure described in Example 11 above using 3 g of 3',6'-bis(p-methoxyanilino)fluoran, 3.5 equivalents of sodium hydride and 3 equivalents of di-tert-butyl dicarbonate and was obtained as a tan solid (yield 1 g, melting range 196°-200° C. Decomp.)

EXAMPLE 15

Preparation of the compound having the formula

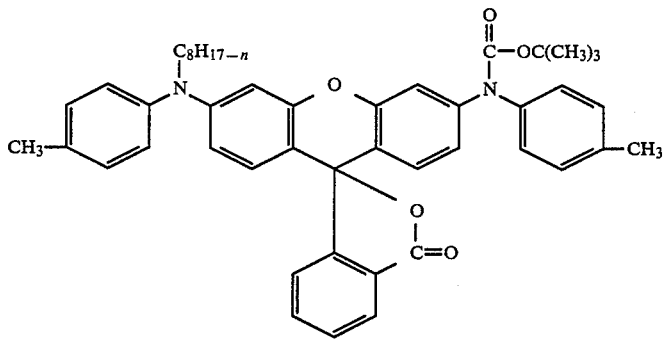

3′,6′-Bis(4-methylanilino)fluoran (1.0 g) and 0.35 g of sodium hydride were stirred at room temperature for 2 hours and then stirred at 45° C. for another 30 minutes. n-Bromooctane (0.34 cc., 1 equivalent) was added by syringe and after stirring briefly at 45° C., the reaction mixture was placed on an oil bath warmed to 65° C. Stirring was continued and the reaction brought to completion by very small additions of n-bromooctane. Monitoring by TLC showed a very clean conversion to the mono-N-octyl fluoran.

The oil bath temperature was reduced to 45° C. and di-tert-butyl dicarbonate (0.4 g, 1 equivalent) was added. TLC showed about 50% conversion within 30 minutes. The oil bath temperature was increased to 50° C. and small quantities of sodium hydride and di-tert-butyl dicarbonate were added. Heating was continued for 2 hours and then the reaction mixture was allowed to cool overnight.

The reaction mixture was poured into 300 cc water containing 100 cc ethyl acetate with vigorous stirring and the organic layer separated, washed with water and brine; dried over sodium sulfate and concentrated to dryness. The residue was triturated with methylene chloride twice and then applied to a medium length medium pressure silica gel column in a minimum amount of methylene chloride. After eluting with methylene chloride and 1% to 8% methanol/methylene chloride, the silica gel containing the desired band of material was removed from the column. Extraction of this material with acetone gave 483 mg of the title compound as an off-white solid, melting range 196°–197° C.

EXAMPLE 16

Preparation of the compound having the formula

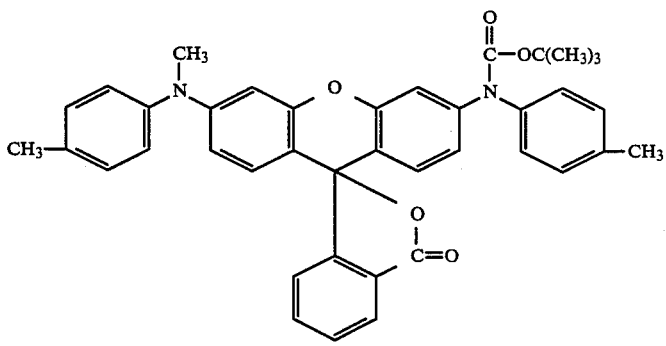

The title compound was prepared according to the procedure given in Example 15 above using 0.5 g of 3′,6′-bis(p-methylanilino)fluoran, about 3.5 equivalents of sodium hydride, 1 equivalent of methyl iodide and 2–3 equivalents of di-tert-butyl dicarbonate (yield 35 mg, melting range 138°–142° C.).

EXAMPLE 17

Preparation of the compound having the formula

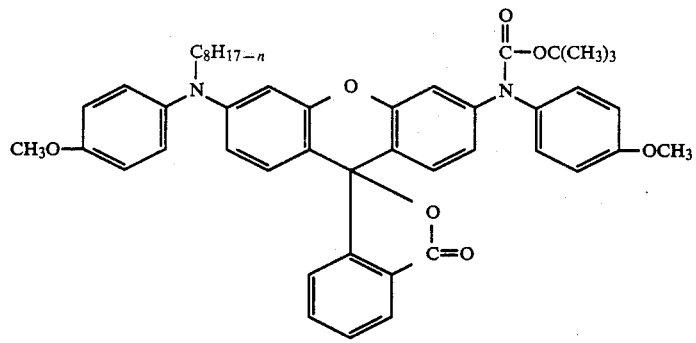

(L)

The title compound was prepared according to the procedure given in Example 15 above using 1.77 g of 3',6'-bis(p-methoxyanilino)fluoran, 3.5 equivalents of sodium hydride, 1 equivalent of n-bromooctane and 1.1 equivalents of di-tert-butyl-dicarbonate and was obtained as a tan solid (yield 0.9 g, melting range 200°–215° C.).

EXAMPLE 18

Preparation of the compound having the formula

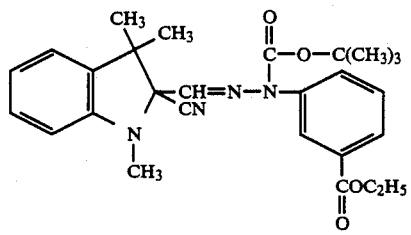

(a) In a 500 ml threeneck roundbottom flask equipped with a mechanical stirrer, a thermometer, an additional funnel and a vent to an exhaust bubbler, ethyl m-aminobenzoate (11.5 g, 0.07 mole) was dissolved in a solution of 140 ml of water containing 22 ml of conc. hydrochloric acid. The almost colorless solution was cooled in a ice-salt bath to −1° C. and a solution of sodium nitrite (5.07 g, 0.0735 mole) in 25 ml of water was added beneath the surface of the aniline.HCl solution over a period of 30 minutes while stirring. After stirring for another 20 minutes in the cold, the reaction mixture gave a positive test for $HNO_2$ with starch iodide paper. Sulfamic acid was added until no $HNO_2$ could be detected by the starch iodide test. While the reaction mixture was stirred at −2° C. 1,3,3-trimethyl-2-methyleneindoline (12.13 g, 0.07 mole) was added dropwise over a period of 1.5 hours while stirring. The reaction temperature was kept below 0° C. The reaction mixture was diluted with about 500 ml of brine solution and the orange solids collected on a filter. The solids were recrystallized from 300 ml of boiling water to yield 13.5 g. of 2-formyl-1,3,3-trimethyl-(3H)-indolium chloride m-carbethoxyphenyl-hydrazone of formula L below after drying over $P_2O_5$ in vacuum. $\lambda_{max}$ 445 nm/Epsilon 42,000 as measured in methanol.

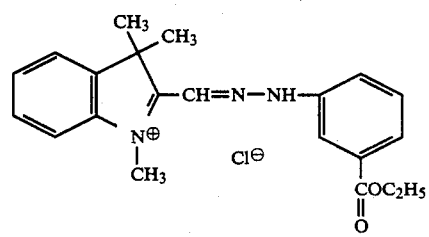

(b) Compound L (8.5 g, 0.022 mole), 150 ml of methylenechloride and 50 ml of water were charged into a 500 ml threeneck roundbottom flask equipped with a mechanical stirrer, thermometer and nitrogen inlet and outlets. The mixture was rapidly stirred at 21° C. under a nitrogen atmosphere while KCN (5.54 g, 0.085 mole) was added portionwise during about 5 minutes. After rapid stirring at room temperature for 48 hours, the orange organic phase was separated and dried over sodium sulfate. (The excess cyanide in the water layer was destroyed by the addition of cold NaOCl). The organic phase was evaporated under reduced pressure to yield 8.71 g of orange solids. The solids were triturated with 200 ml of ether and filtered to give 5.88 g of a yellow soild. The solid sample (5.88 g) was rich in the new compound, 2-cyano-2-formyl-1,3,3-trimethylindoline m-carbethoxyphenyl hydrazone of formula M below.

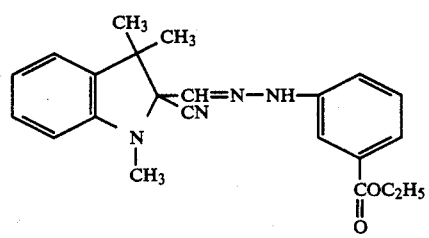

(M)

(c) A 500 ml threeneck roundbottom flask equipped with a thermometer, nitrogen inlet and outlet, a condenser, and a magnetic stirrer was charged with 150 ml methylene chloride, di-tert-butyl-dicarbonate (5.24 g, 0.024 mole) 4-dimethylaminopyridine (1.32 g, 0.019 mole) and Compound M (7.33 g, 0.019 mole) as a solids mixture which contained about 30–40% of the ionic cyanide species. The orange solution was stirred under a nitrogen atmosphere at room temperature overnight. After washing the reaction solution with water (3×75 ml), it was dried over sodium sulfate and evaporated under reduced pressure to yield 14.6 g of an orange syrup. Thin layer analysis (silica gel eluted with a mixture ethyl acetate/n-hexane-3:7) revealed a new colorless compound and a yellow compound that corresponded to the unreacted ionic starting compound component. The new compound was isolated by preparative column chromatography (silica gel column eluted with 3:7 ethyl acetate/n-hexane) to yield 9.2 g of the title compound as an almost colorless solid. The assigned structure was supported by mass spectroscopy and NMR.

EXAMPLE 19

Preparation of the compound having the formula

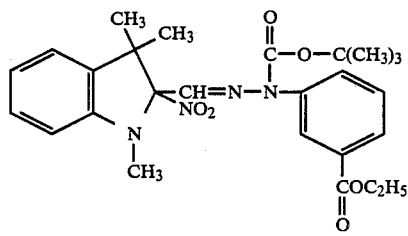

Silver nitrite (0.353 g, 0.0023 mole) was added to a cold (about 5° C.) solution of the compound of Example 18 (0.51 g, 0.0011 mole) in 40 ml of tetrahydrofuran while stirring. Stirring at room temperature and in the dark continued for 48 hours. The reaction mixture was filtered to remove AgCN and excess AgNO2. Evaporation of the filtrate gave approximately 0.5 g of an orange viscous syrup from which the title compound (260 mg) was isolated by chromatography (silica gel eluted with 7:3 n-hexane/ethylacetate). The structural assignment was supported by mass spectroscopy and NMR.

EXAMPLE 20

Preparation of the compound having the formula

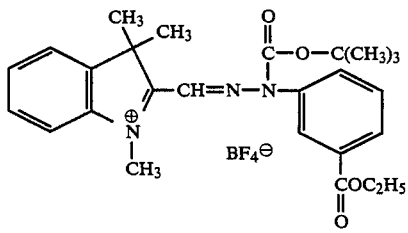

In a small round bottom flask fitted with magnetic stirring bar, the compound of Example 18 (0.10 g, 0.0002 mole) and silver tetrafluoroborate (0.039 g, 0.0002 mole) were dissolved in 5 ml acetone. The mixture was stirred about 45 minutes and allowed to stand overnight. Thin layer analysis (silica gel eluted with a mixture of ethylacetate/n-hexane—30:70) showed only a trace of starting hydrazone compound. The reaction mixture was filtered to remove AgCN and the yellow filtrate diluted with about 2-3 volumes of n-hexane. The precipitate that formed was filtered and pressed to give 110 mg of the title compound as a yellow solid. The assigned structure was supported by NMR.

EXAMPLE 21

Preparation of the compound having the formula

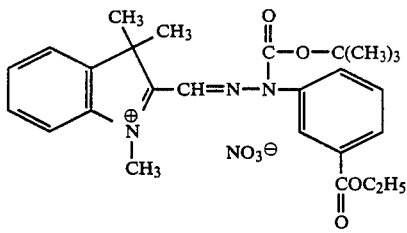

In a 50 ml threeneck roundbottom flask equipped with nitrogen inlet, magnetic stirrer and condenser, the compound of Example 18 (0.64 g, 0.0013 mole) was dissolved in 35 ml of acetone to give a clear yellow solution. Silver nitrate (0.22 g, 0.0013 mole) was added and the reaction mixture stirred for about one hour. Stirring was continued overnight and thin layer analysis (silica gel eluted with a mixture of ethyl acetate/n-hexane—30:70) indicated that the reaction was substantially complete. The reaction mixture was filtered to remove AgCN and the yellow filtrate evaporated to yield 960 mg of yellow syrup. The syrup was dissolved in 15 ml of acetone, charcoal treated and filtered through Celite. The light yellow filtrate was diluted with about 5 ml of acetone rinse and then about 40 ml of n-hexane was added to the cloud point. The precipitate of tiny crystalline spheres that formed were filtered and pressed to yield 450 mg of the title compound as a light yellow powder. The assigned struture was supported by NMR.

EXAMPLE 22

Preparation of the compound having the formula

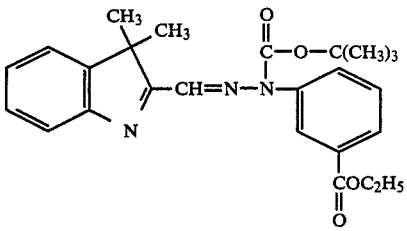

(a) In a 500 ml threeneck roundbottom flask equipped with a mechanical stirrer, a thermometer, an addition funnel and a vent to an exhaust bubbler, ethyl m-aminobenzoate (5.75 g, 0.035 mole) was dissolved in a solution of 70 ml of water containing 11 ml of conc. hydrochloric acid. The almost colorless solution was cooled in an ice-salt bath to −1° C. and a solution of sodium nitrite (2.54 g, 0.0368 mole) in 15 ml of water was added beneath the surface of an aniline.HCl solution over a period of 30 minutes while stirring. After stirring for another 20 minutes in the cold, the reaction mixture gave a positive test for HNO2 with starch iodide paper. Sulfamic acid was added until no HNO2 could be detected by the starch iodide test. While the reaction mixture was stirred at −2° C. 3,3,2-trimethylindoline (5.6 g, 0.035 mole) was added dropwise over a period of 1.5 hours while stirring. The reaction temperature ws kept below 0° C. The product as set out in formula (N) below was collected on a filter and purified by column chromatography (silica gel, 5% methanol in methylene chloride). Characterized by M/e⁻336, λ_max 443 nm.

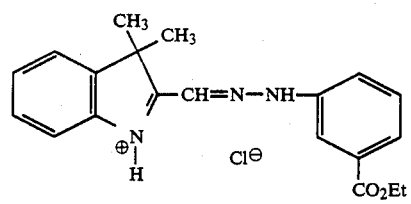

(b) Compound (N) (744 mg, 2 mmole) was dissolved in methylenechloride 925 ml) containing 4-dimethylaminopyridine (488 mg, 4 mmole) and di-tert-butyl dicarbonate (872 mg, 4 mmole) added at room temperature with stirring. The reaction mixture was refluxed for 4 hours and the title compound was isolated by column chromatography (silica gel, 4% n-hexane) and crystalization from n-hexane. Characterized by M/e⁻435 and NMR.

EXAMPLE 23

Preparation of the compound having the formula

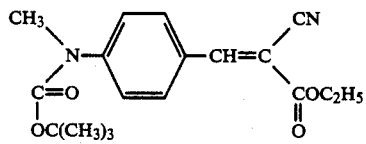

Compound O having the following formula was used as the starting material below.

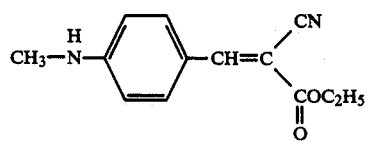

The nitrogen anion of Compound N was generated by adding 1.5 equivalents of sodium hydride to 300 mg of Compound N in dimethyl sulfoxide and then 2 equivalents of di-tert-butyl-dicarbonate was added. The reaction mixture was warmed at about 30° C. and allowed to stir overnight. Thin layer chromatography using 5% ethyl acetate/n-hexane showed a colorless compound which turned yellow upon heating. Water work up followed by preparative silica gel chromatography gave 370 mg of pure title compound as a faint yellow oil. The assigned structure was supported by mass spectroscopy. λ_max 338 nm/Epsilon 19,200 as measured in methanol.

EXAMPLE 24

Preparation of the compound having the formula

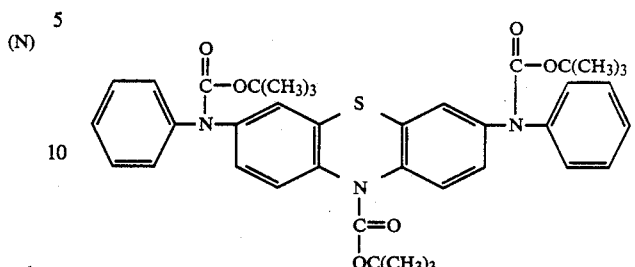

(a) the intermediate having the formula

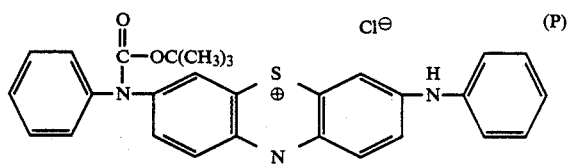

was prepared by treating 2,7-dianilinophenothiazonium chloride (3.24 g, 0.00774 mole) with sodium hydride (3 equivalents) in 150 ml of dry dimethyl sulfoxide over 1.5 hours at ambient temperature. The mixture was heated to 45° C. over 40 minutes and di-tert-butyl dicarbonate (3 equivalents) was subsequently added over 10 minutes. The reaction mixture was poured into 750 ml of water and filtered to provide a pasty precipitate which was dissolved in 300 ml of methylene chloride and dried over sodium sulfate. After filtration the filtrate's volume was reduced to 50 ml, and it was applied to a Waters High Pressure chromatography system (silica gel substrate). The mixture was eluted with 80:20-hexane:ethyl acetate to provide 900 mg. purified intermediate (Compound P), (structure confirmed by NMR and mass spectroscopy).

(b) The title compound was prepared by reduction of the above intermediate (Compound P) followed by in-stiu treatment with excess di-tert-butyl dicarbonate. Thus, the intermediate (0.9 g, 0.00174 mole) was stirred under nitrogen in a mixture of methylene chloride (65 ml) and water (20 ml) containing sodium dithionite (0.91 g, 0.00522 mole), a couple of crystals of tetrabutyl ammonium chloride, and sodium bicarbonate (2.19 g, 0.0261 mole). The blood-red mixture became straw-yellow when reduction was complete. The methyl chloride layer was transferred to a concentration flask (containing some solid Na₂S₂O₄ and NaHCO₃) under nitrogen. The methylene chloride was removed under reduced pressure. The residue was dissolved in 65 ml of tetrahydrofuran and transferred under nitrogen to a reaction flask containing a little Na₂S₂O₄ and NaHCO₃ plus one ml water. Di-tert-butyl dicarbonate (19.62 g, 0.09 mole) was added portion-wise in 60 ml of tetrahydrofuran over 4.5 hours to the refluxing solution of the reduced intermediate. The reaction was followed by thin layer chromatography (80:20 n-hexane:ethyl acetate eluant) and isolated by column chromatography. M/e⁻ calculated: 682, found 682.

The thermal "bleaching" of the compounds of Examples 1 to 6 and 10 were evaluated by heating a sample of each compound in polyvinyl pyrrolidone coated on a glass plate. The coatings were prepared by combining approximately equal weights of compound and polyvinyl pyrrolidone in a suitable solvent, for example, methanol or 2-methoxyethanol, applying a layer of the coating solution on a glass plate using a #12 Mirod, and allowing the coating to air dry. The testing of the samples and the results as determined by visual observation were as follows.

Example 1—A sample placed on a hot plate was gradually heated to 175° C. fading began at about 150° C. and bleaching was complete by 175° C. Another sample placed on a hot plate preheated to 175° C. bleached in approximately 90 seconds.

Example 2—A sample placed on a hot plate was gradually heated and began to bleach at about 150° C. The sample was slowly heated to about 180°–185° C. over a period of several minutes to complete bleaching. Another sample placed on a hot plate preheated at 180°–185° C. bleached completely in about 40 seconds.

Additional samples were prepared as described above except that a second glass plate was placed on top of the coating so that the layer of compound was sandwiched between the two glass plates. A pair of heating platens designed for a laboratory hydraulic press were mounted in a movable arrangement to provide a convenient bench-top method of controlling temperature, and the "sandwich" was positioned firmly between the pair of heating platens which had been previously heated to and equilibrated at a preselected temperature. In this way, the sample coatings were heated from both directions.

Testing of the compounds of Examples 1, 2, 4 and 10 in this manner showed substantially quantitative bleaching in 60 seconds at 180° C. The compound of Example 3 bleached when heated for 45 to 60 seconds at 180° C., and the compound of Example 5 bleached well in 30 seconds at 180° C. but had a green tint. The compound of Example 6 showed partial bleaching after 5 minutes at 165° C. and complete bleaching after 1 to 2 minutes at 210° C.

In carrying out the present invention, the way in which the heat in applied or induced imagewise may be realized in a variety of ways, for example, by direct application of heat using a thermal printing head or thermal recording pen or by conduction from heated image-markings of an original using conventional thermographic copying techniques. Preferably, selected heating is produced in the heat-sensitive element itself by the conversion of electromagnetic radiation into heat and preferably, the light source is a laser beam emitting source such as a gas laser or semiconductor laser diode. The use of a laser beam is not only well suited for recording in a scanning mode but by utilizing a highly concentrated beam, radiant energy can be concentrated in a small area so that it is possible to record at high speed and high density. Also, it is a convenient way to record data as a heat pattern in response to transmitted signals such as digitized information and a convenient way of preparing multicolor images by employing a plurality of laser beam source that emit laser beams of different wavelengths.

For example, using heat-sensitive compounds that absorb radiation at different predetermined wavelengths in the visible wavelength range, such as, yellow, magenta and cyan colored compounds, laser sources are selected that will emit at the wavelengths strongly absorbed by the respective compounds, and multicolor images can be prepared by addressing each color in a separate scan or preferably by addressing all of the colors in a single scan. Either way, the light asorbed by the respective heat-sensitive compounds is converted into heat and the heat initiates the irreversible, unimolecular fragmentation reaction to effect bleaching of the compounds.

In a preferred embodiment, the heat-sensitive element contains an infra-red absorbing substance for converting infra-red radiation into heat which is transferred to the heat-sensitive compound to initiate said fragmentation reaction and effect the change in the absorption characteristics of the heat-sensitive compound from colored to colorless, from colorless to colored or from one color to another. Obviously, the infra-red absorber should be in heat-conductive relationship with the heat-sensitive compound, for example, in the same layer as the heat-sensitive compound or in an adjacent layer. Though an inorganic compound may be employed, the infra-red absorber preferably is an organic compound, such as, a cyanine, merocyanine, squarylium or thiopyrylium dye and preferably, is substantially non-absorbing in the visible region of the electromagnetic spectrum so that it will not contribute any substantial amount of color to the $D_{min}$ areas, i.e., the highlight areas of the image.

In the production of multicolor images via infra-red absorbers, they may be selected such that they absorb radiation at different predetermined wavelengths above 700 nm sufficiently separated so that each imaging layer may be exposed separately and independently of the others by using infra-red radiation at the particular wavelengths selectively absorbed by the respective infra-red absorbers. As an illustration, the layers of heat-sensitive compound for forming or bleaching yellow, magenta and cyan may have infra-red absorbers associated therewith that absorb radiation at 760 nm, 820 nm and 880 nm, respectively, and may be addressed by laser beam sources, for example, infra-red laser diodes emitting laser beams at these respective wavelengths so that the yellow imaging layer can be exposed independently of the magenta and cyan imaging layers, the magenta imaging layer can be exposed independently of the yellow and cyan imaging layers, and the cyan imaging layer can be exposed independently of the yellow and magenta imaging layers. While each layer may be exposed in a separate scan, it is usually preferred to expose all of the imaging layers simultaneously in a single scan using multiple laser beam sources of the appropriate wavelengths. Rather than using superimposed imaging layers, the heat-sensitive compounds and associated infra-red absorbers may be arranged in an array of side-by-side dots or stripes in a single recording layer.

In a further embodiment, multicolor images may be produced using the same infra-red absorbing compound in association with each of two or more superposed imaging layers and exposing each imaging layer by controlling the depth of focussing of the laser beam. In this embodiment, the concentration of infra-red absorber is adjusted so that each of the infra-red absorbing layers absorb approximately the same amount of laser beam energy. For example, where there are three infra-red absorbing layers, each layer would absorb about one-third of the laser beam energy. It will be appreciated that controlling the focussing depth to address each layer separately may be carried out in combination with the previous embodiment of using infra-red absorbers that selectively absorb at different wavelengths in which instance the concentration of infra-red absorber would not have to be adjusted for the laser beam energy since the first infra-red dye would not absorb any subtantial amount of radiation at the absorption peaks of the second and third dyes and so forth.

Where imagewise heating is induced by converting light to heat as in the embodiment described above, the heat-sensitive element may be heated prior to or during imagewise heating. This may be achieved using a heating platen or heated drum or by employing an additional laser beam source or other appropriate means for heating the element while it is being exposed imagewise.

The heat-sensitive elements of the present invention comprise a support carrying at least one layer of the above-denoted heat-sensitive compounds and may contain additional layers, for example, a subbing layer to improve adhesion to the support, interlayers for thermally insulating the imaging layers from each other, infra-red absorbing layers as discussed above, an anti-abrasive topcoat layer which also may function as a UV protecting layer by including an ultraviolet absorber therein or other auxiliary layers. The heat-sensitive compounds are selected to give the desired color or combination of colors, and for multicolor images, the compounds selected may comprise the additive primary colors red, green and blue, the subtractive primaries yellow, magenta and cyan or other combinations of colors, which combinations may additionally include black. As noted previously, the compounds generally are selected to give the subtractive colors cyan, magenta and yellow as commonly employed in photographic processes to provide full natural color.

The support employed may be transparent or opaque and may be any material that retains its dimensional stability at the temperature used for image formation. Suitable supports include paper, paper coated with a resin or pigment, such as, calcium carbonate or calcined clay, synthetic papers or plastic films, such as polyethylene, polypropylene, polycarbonate, cellulose acetate, polyethylene terephthalate and polystyrene.

Usually the layer of heat-sensitive compound contains a binder and is formed by combining the heat-sensitive compound and a binder in a common solvent, applying a layer of the coating composition to the support and then drying. Rather than a solution coating, the layer may be applied as a dispersion or an emulsion. The coating composition also may contain dispersing agents, plasticizers, defoaming agents, coating aids and materials such as waxes to prevent sticking where thermal recording heads or thermal pens are used to apply the imagewise pattern of heat. In forming the layer(s) containing the heat-sensitive compounds and the interlayers or other layers, temperatures should be maintained below levels that will initiate the fragmentation reaction so that the heat-sensitive compounds will not be prematurely colored or bleached.

Examples of binders that may be used include polyvinyl alcohol, polyvinyl pyrrolidone, methyl cellulose, cellulose acetate butyrate, copolymers of styrene and butadiene, polymethyl methacrylate, copolymers of methyl and ethyl acrylate, polyvinyl acetate, polyvinyl butyral, polycarbonate and polyvinyl chloride. It will be appreciated that the binder selected should not have any adverse effect on the heat-sensitive compound incorporated therein and may be selected to have a beneficial effect. Also, it should be heat-stable at the temperatures encountered during image formation and it should be transparent so that it does not interfere with viewing of the color image. Where electromagnetic radiation is employed to induce imagewise heating, the binder also should transmit the light intended to initiate image formation.

In addition to the above-mentioned reagents, it is desirable to include an acidic substance, for example, a phenol, such as, bis-phenol A or dodecylresorcinol in the layer of heat-sensitive compound when using the compounds of formula (9) above. Though not essential, the incorporation of such a material enhances color formation. Also, an oxidizing agent may be included for the compounds of formula (13).

As a further illustration of the present invention, heat-sensitive compounds of the foregoing Examples and of formulae (a) to (c) below were coated on a polyethylene terephthalate support by combining the compound and a binder and optionally, an infra-red absorber in a common solvent, applying a layer of the coating composition to the support and then drying the coating. In addition to the above, further samples were prepared in the same manner except that the layer of heat-sensitive compound was overcoated with a layer of infra-red absorber. The formulations used for the various coatings are set forth in Table I below wherein cellulose acetate butyrate, polyvinyl pyrrolidone and ethylene/maleic anhydride copolymer used as the binder in the sample coatings are abbreviated as "CAB", "PVP" and "EMA", respectively.

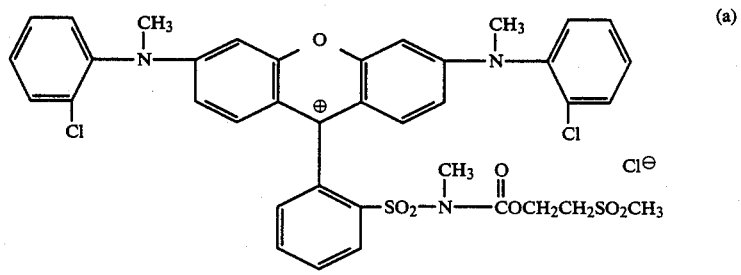

(a)

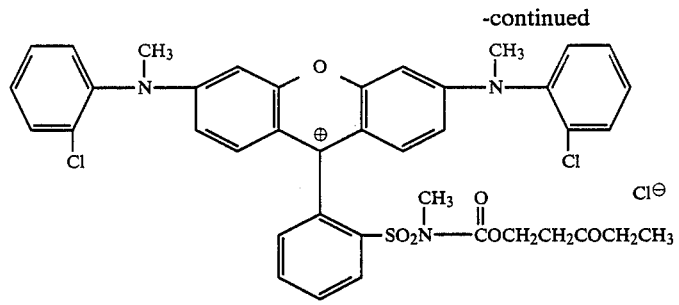

(b)

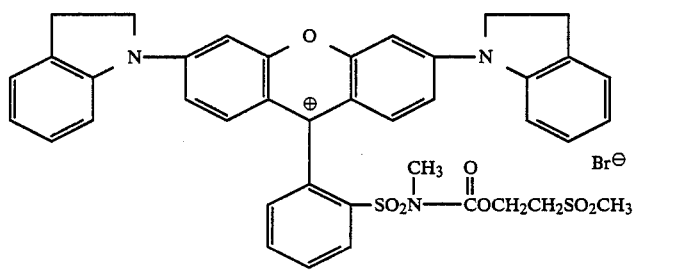

(c)

The coated samples were irradiated using an argon laser (Ar) or a krypton laser (Kr), and the laser beam was focussed to approximately 25 microns in diameter in the imaging layer. The wavelength of the laser beam emitted in terms of nanometers (nm), the output in terms of milliwatts (MW) and the scanning speed in terms of inches per second (in./sec.) also are set forth in Table I.

The infra-red absorber used in the samples and designated "IR Dye" in Table I was the compound having the formula The compounds of Examples 1 to 10 represent initially colored compounds with Examples 1 and 9 being cyan, Examples 2, 6 to 8 and 10 being magenta, Examples 3 and 4 being yellow and Example 5 being black. Compounds (a), (b) and (c) also are initially colored with (a) and (b) being magenta and (c) being cyan.

The compounds of Examples 11 to 24 represent initially colorless compounds which upon heating to effect said fragmentation reaction form color with Examples 11 to 17 forming magenta, Examples 18 to 23 forming

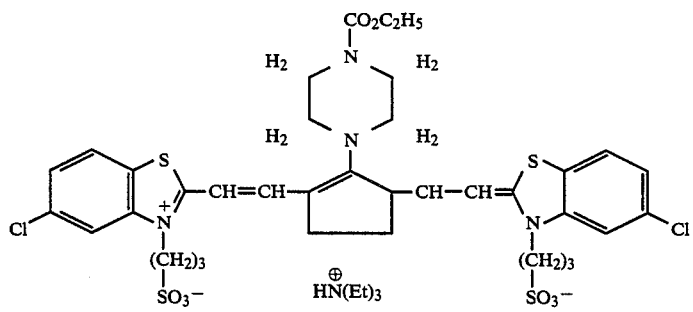

yellow and Example 24 forming cyan.

TABLE I

| Sample | Compound | Binder | Solvent | Laser λ | Output (mW) | Scan (in/sec) |
|---|---|---|---|---|---|---|
| 1 | 0.04 g Ex 1 | 0.04 g CAB | 2 ml acetone/Et acetate(3/1) | 648 nm (Kr) | 105 | 12.5 |
| 2 | 0.04 g Ex 2 | 0.04 g CAB | 2 ml acetone/Et acetate(3/1) | 515 nm (Ar) | 176 | 25.0 |
| 3 | 0.02 g Ex 3 | 0.02 g CAB | 1 ml acetone/Et acetate(3/1) | 488 nm (Ar) | 82.8 | 6.7 |
| 4 | 0.075 g Ex 4 | PVP* | ½ ml dimethylformamide | 488 nm (Ar) | 200 | 17.2 |
| 5 | 0.01 g Ex 5 | 0.01 g CAB | 1 ml acetone/Et acetate(3/1) | 488 nm (Ar) | 43 | 3.4 |
| 6 | 0.02 g Ex 6 | 0.02 g CAB | 1 ml acetone/Et acetate(3/1) | 515 nm (Ar) | 45 | 3.4 |
| 7 | 0.01 g Ex 7 | 0.01 g CAB | ½ ml acetone/Et acetate(3/1) | 568 nm (Kr) | 100 | 3.4 |
| 8 | 0.02 g Ex 8 | 0.02 g CAB | 1 ml acetone/Et acetate(3/1) | 515 nm (Ar) | 45 | 3.4 |
| 9 | 0.01 g Ex 10 | 0.01 g CAB | ½ ml acetone/Et acetate(3/1) | 515 nm (Ar) | 176 | 25.0 |
| 10 | 0.01 g Ex 2<br>0.005 g Ex 5 | 0.01 g CAB | 1 ml acetone/Et acetate(3/1) | 488 nm (Ar) | 43 | 3.4 |
| 11 | 0.02 g Cpd(a) | 0.02 g CAB | 1 ml acetone/Et acetate(3/1) | 515 nm (Ar) | 45 | 3.4 |
| 12 | 0.02 g Cpd(b) | 0.02 g CAB | 1 ml acetone/Et acetate(3/1) | 515 nm (Ar) | 45 | 3.4 |
| 13 | 0.02 g Cpd(c) | 0.02 g PVP | 1 ml methanol/water(1/1) | 648 nm (Kr) | 105 | 12.5 |
| 14 | 0.005 g Ex 2<br>0.005 g IR Dye<br>0.03 g Ex 5 | 0.005 g PVP | 0.5 g methanol | 752 nm (Kr) | 117 | 16.8 |

TABLE I-continued

| Sample | Compound | Binder | Solvent | Laser λ | Output (mW) | Scan (in/sec) |
|---|---|---|---|---|---|---|
| 15 | 0.01 g Ex 2<br>0.01 g IR Dye | 0.04 g PVP | 1 ml methanol | 752 nm (Kr) | 113 | 7.8 |
| 16 | 0.02 g Ex 2<br>Overcoated with IR formulation (1) | 0.02 g CAB | 1 ml acetone/Et acetate(3/1) | 752 nm (Kr) | 85 | 7.8 |
| 17 | 0.01 g Ex 2<br>0.03 g Ex 5<br>Overcoated with IR formulation (1) | 0.04 g PVP | 1 ml methanol | 752 nm (Kr) | 113 | 15.6 |
| 18 | 0.02 g Ex 18<br>Overcoated with IR formulation (2) | 0.02 g PVP | 2 ml methanol | 752 nm (Kr) | 110 | 10.0 |
| 19 | 0.02 g Ex 13 | 0.02 g EMA<br>0.01 g dodecylresorcinol<br>0.005 g citric acid | 1 ml 2% Butvar/THF** | 752 nm (Kr) | 110 | 2.5 |
| 20 | Overcoated with IR formulation (2)<br>0.02 g Ex 11 | 0.004 g dodecylresorcinol<br>0.006 g citric acid | ½ ml 2% butvar/THF** | 752 nm (Kr) | 110 | 2.5 |
| 21 | Overcoated with IR formulation (2)<br>0.02 g Ex 14 | 0.02 g dodecylresorcinol<br>0.01 g citric acid | 1 ml 2% butvar/THF** | 752 nm (Kr) | 110 | 2.5 |
| 22 | Overcoated with IR formulation (2)<br>0.02 g Ex 20<br>Overcoated with IR formulation (2) | 0.02 g PVP | 2 ml methanol | 752 nm (Kr) | 110 | 10.0 |

*2% polyvinyl pyrrolidone in 2-methoxyethanol/chloroform
**2% polyvinyl butyral resin in tetrahydrofuran solution
IR formulation (1) - 0.01 g IR DYE, 0.01 g polyvinyl pyrrolidone and ½ ml methanol/water (1/1)
IR formulation (2) - 0.0025 g IR Dye, 0.02 g polyvinyl pyrrolidone, ½ ml methanol, 1 ml water and 0.15 ml (3% MIRANOL H2M-SF and 1% AEROSOL OT)

The maximum and minimum transmission densities were measured for the exposed sample coatings 1 to 3 and 5 to 17 using a Macbeth transmission densitometer Model TD504 equipped with an S4 photomultiplier and color Filter Nos. 29, 93 and 94 for red (R), green (G), and blue (B), respectively. The results are reported in Table II below.

TABLE II

| Sample | Dmax/Dmin |
|---|---|
| 1 | 0.90/0.28(R) |
| 2 | 1.31/0.49(G) |
| 3 | 1.00/0.21(B) |
| 5 | 0.49/0.11(R) |
|   | 0.30/0.10(G) |
|   | 0.53/0.14(B) |
| 6 | 0.94/0.24(G) |
| 7 | 0.41/0.24(G) |
| 8 | 1.25/0.18(G) |
| 9 | 1.66/0.90(G) |
| 10 | 0.58/0.08(R) |
|    | 0.66/0.11(G) |
|    | 0.59/0.11(B) |
| 11 | 0.96/0.22(G) |
| 12 | 0.94/0.24(G) |
| 13 | 0.59/0.16(R) |
| 14 | 0.45/0.12(G) |
| 15 | 0.45/0/08(R) |
|    | 0.56/0.12(G) |
|    | 0.42/0.11(B) |
| 16 | 0.95/0.10(G) |
| 17 | 0.50/0.09(R) |
|    | 0.51/0.13(G) |
|    | 0.44/0.16(B) |

Visual observation of exposed samples 18 to 22 indicated that the extent of color formation induced by laser exposure was substantially equal to the color formation observed by heating the respective samples on a hot plate.

Further sample coatings 23 to 30 were prepared in the same manner described above. Samples 23 to 27 were identical to samples 18 to 22, respectively, as set out in Table I above except that the solvent used for sample 27 was 1 ml acetone/ethyl acetate (3/1) instead of 2 ml methanol. Sample 28 was prepared using 0.02 g of the compound of Example 12, 0.02 g of citric acid and 2 ml of 2% Butvar in THF and overcoated with IR formulation (2). Sample 29 was prepared using 0.02 g of the compound of Example 17, 0.02 g of citric acid and 1 ml of 2% Butvar in THF and overcoated with IR formulation (2). Sample 30 was prepared using 0.02 g of the compound of Example 29 and 1 ml of 2% Butvar in THF and was overcoated with IR formulation (2). These coatings were exposed to a krypton laser in the same manner described above. The particular exposure conditions and the maximum and minimum transmissions densities measured for the exposed samples are given in Table III.

TABLE III

| Sample | Laser λ | Output (mW) | Scan (in/sec) | Dmax/Dmin |
|---|---|---|---|---|
| 23 | 752 nm | 120 | 1.0 | 0.64/0.11(B) |
| 24 | 752 nm | 120 | 1.0 | 1.19/0.20(G) |
| 25 | 752 nm | 120 | 1.0 | 0.97/0.18(G) |
| 26 | 752 nm | 120 | 1.0 | 1.06/0.20(G) |
| 27 | 752 nm | 120 | 16.0 | 0.86/0.22(B) |
| 28 | 752 nm | 120 | 1.0 | 0.52/0.24(G) |
| 29 | 752 nm | 120 | 1.0 | 0.88/0.24(G) |
| 30 | 752 nm | 120 | 8.0 | 0.48/0.24(B) |

As mentioned previously, the formation or bleaching of color or a change in color is achieved according to the present invention by the irreversible unimolecular fragmentation of one or more thermally unstable carbomate moieties. As can be seen from the results presented above, color is formed in the heated areas of the sample coatings comprising the initially colorless compounds, such as, sample coatings 18 to 30. In the sample coatings 1 to 17 comprising the initially colored compounds, color is bleached in the heated areas.

As discussed previously, the heat-sensitive elements of the present invention may be used in various thermal recording systems including thermal printing, thermographic copying and, particularly, high-speed laser recording to provide high-contrast, high resolution images suitable for viewable color prints and transparencies, color images requiring magnification such as microfilm, color filters for color displays and color sensors, optical disks and so forth. Depending upon the particular application, the heat-sensitive elements may contain insulating layers, reflective, topcoat or other layers and the various layers including the imaging layer(s) together with any infra-red absorbing layer(s) may be arranged in the configuration as desired and appropriate.

Since certain changes may be made in the herein described subject matter without departing from the scope of the invention herein involved, it is intended that all matter contained in the above description and examples be interpreted as illustrative and not in a limiting sense.

What is claimed is:

1. A compound of the formula

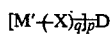

wherein M' has the formula

wherein R is alkyl; —$SO_2R_1$ wherein $R_1$ is alkyl; phenyl; naphthyl; or phenyl substituted with alkyl, alkoxy, halo, trifluoromethyl, cyano, nitro, carboxy, —$CONR_2R_3$ wherein $R_2$ and $R_3$ each are hydrogen or alkyl, —$CO_2R_4$ wherein $R_4$ is alkyl or phenyl, —$COR_5$ wherein $R_5$ is amino, alkyl or phenyl, —$NR_6R_7$ wherein $R_6$ and $R_7$ each are hydrogen or alkyl, —$SO_2NR_8R_9$ wherein $R_8$ and $R_9$ each are hydrogen, alkyl or benzyl, Z' has the formula

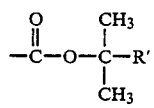

wherein R' is halomethyl or alkyl; X is —N=, —$SO_2$— or —$CH_2$—; D taken with X and M' represents the radical of a color-shifted organic dye; q is 0 or 1; and p is a whole number of at least 1; said Z' being removed from said M' upon the application of heat to effect a visually discernible change in spectral absorption characteristics of said dye.

2. A compound as defined in claim 1 wherein said organic dye is a thiazine dye.

3. A compound as defined in claim 1 wherein p is 1 and q is 1.

4. A compound as defined in claim 3 wherein X is —N= and said organic dye is an azocarbocyanine dye.

5. A compound as defined in claim 3 wherein X is —$SO_2$— and said organic dye is a rhodamine dye.

6. A compound as defined in claim 3 wherein X is —$SO_2$— and said organic dye is a triarylmethane dye.

7. A compound as defined in claim 3 wherein X is —$CH_2$— and said organic dye is a rhodamine dye.

8. A compound as defined in claim 3 wherein X is —$CH_2$— and said organic dye is a fluoran dye.

9. A compound as defined in claim 1 wherein p is 1 and q is 0.

10. A compound as defined in claim 9 wherein said organic dye is a rhodamine dye.

11. A compound as defined in claim 9 wherein said organic dye is a benzylidene dye.

12. A compound as defined in claim 1 wherein said R' is a methyl.

13. A compound as defined in claim 1 wherein said compound is initially colorless.

14. A compound as defined in claim 1 wherein said compound is initially colored.

* * * * *